(12) United States Patent
Khlat et al.

(10) Patent No.: US 9,178,364 B1
(45) Date of Patent: Nov. 3, 2015

(54) SWITCHING POWER SUPPLY WITH BATTERY

(75) Inventors: Nadim Khlat, Midi-Pyrenees (FR); Alexander Wayne Hietala, Phoenix, AZ (US); Chris Ngo, Chandler, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 697 days.

(21) Appl. No.: 12/209,814

(22) Filed: Sep. 12, 2008

Related U.S. Application Data

(60) Provisional application No. 60/971,781, filed on Sep. 12, 2007.

(51) Int. Cl.
   *H02J 7/00* (2006.01)

(52) U.S. Cl.
   CPC .................................. *H02J 7/0013* (2013.01)

(58) Field of Classification Search
   USPC .......... 320/132, 134, 135, 136, 140; 323/282, 323/299; 324/426, 427; 340/636.12, 340/636.13, 636.17, 636.2
   See application file for complete search history.

(56) References Cited

U.S. PATENT DOCUMENTS

| | | | | |
|---|---|---|---|---|
| 5,602,463 A * | 2/1997 | Bendall et al. | ................. | 323/266 |
| 5,850,137 A * | 12/1998 | Takimoto et al. | ............. | 320/164 |
| 5,969,513 A * | 10/1999 | Clark | ............................ | 323/282 |
| 6,160,441 A * | 12/2000 | Stratakos et al. | ............. | 327/540 |
| 7,288,924 B2 * | 10/2007 | Trandafir et al. | ............. | 323/283 |
| 7,333,781 B1 | 2/2008 | Stockstad et al. | | |
| 7,450,916 B1 | 11/2008 | Hietala et al. | | |
| 7,564,220 B2 * | 7/2009 | Niculae et al. | ................ | 320/131 |
| 7,956,615 B1 | 6/2011 | Jaoude et al. | | |
| 7,962,109 B1 | 6/2011 | Stockstad et al. | | |
| 7,977,919 B1 | 7/2011 | Jaoude et al. | | |
| 8,536,837 B1 | 9/2013 | Jaoude et al. | | |
| 2004/0027097 A1 * | 2/2004 | DeNicholas et al. | ......... | 323/222 |
| 2004/0095117 A1 * | 5/2004 | Kernahan et al. | ............. | 323/282 |
| 2006/0015274 A1 * | 1/2006 | Trandafir et al. | ............... | 702/64 |
| 2006/0139005 A1 * | 6/2006 | Niculae et al. | ................ | 320/132 |

\* cited by examiner

*Primary Examiner* — Drew A Dunn
*Assistant Examiner* — Steve T Chung
(74) *Attorney, Agent, or Firm* — Withrow & Terranova, P.L.L.C.

(57) ABSTRACT

The present invention relates to estimating a battery current supplied from a battery to a switching power supply, which provides a regulated output signal to a load, based on a switching power supply current in the switching power supply, and then controlling the regulated output signal to limit the battery current to within an acceptable threshold. The switching power supply current may be provided by one or more switching elements in the switching power supply. The switching elements may be mirrored to provide a mirrored switching power supply current, which is used to estimate the battery current. The estimated battery current may include an estimated average battery current, an estimated instantaneous battery current, or both.

28 Claims, 24 Drawing Sheets

SWITCHING POWER SUPPLY WITH BATTERY

This application claims the benefit of provisional patent application Ser. No. 60/971,781, filed Sep. 12, 2007, the disclosure of which is hereby incorporated herein by reference in its entirety.

FIELD OF THE INVENTION

Embodiments of the present invention relate to over-current protection of batteries used with switching power supplies.

BACKGROUND OF THE INVENTION

Battery-powered devices, such as cell phones, personal digital assistants (PDAs), MP3 players, and the like, often include a switching power supply to translate a voltage from a battery to a load, to provide a regulated voltage to the load as the battery voltage changes, or both. As the battery is depleted, its output voltage, called the battery voltage, tends to droop. A drooping battery voltage may cause the switching power supply to increase the current provided by the battery, called the battery current, to compensate. For some battery technologies, the battery current should not exceed a maximum battery current rating, which may include a maximum instantaneous battery current rating, a maximum average battery current rating, or both. Directly measuring battery current may be problematic since direct current (DC) current measurements often require a series element, which may add undesirable losses, complexity, or both. Thus, there is a need to estimate instantaneous battery current, average battery current, or both, of a battery that is used to power a switching power supply.

SUMMARY OF THE EMBODIMENTS

The present invention relates to estimating a battery current supplied from a battery to a switching power supply, which provides a regulated output signal to a load, based on a switching power supply current in the switching power supply, and then controlling the regulated output signal to limit the battery current to within an acceptable threshold. The switching power supply current may be provided by one or more switching elements in the switching power supply. The switching elements may be mirrored to provide a mirrored switching power supply current, which is used to estimate the battery current. The estimated battery current may include an estimated average battery current, an estimated instantaneous battery current, or both. The switching power supply may be a buck switching power supply, a boost switching power supply, or a combination buck and boost switching power supply.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
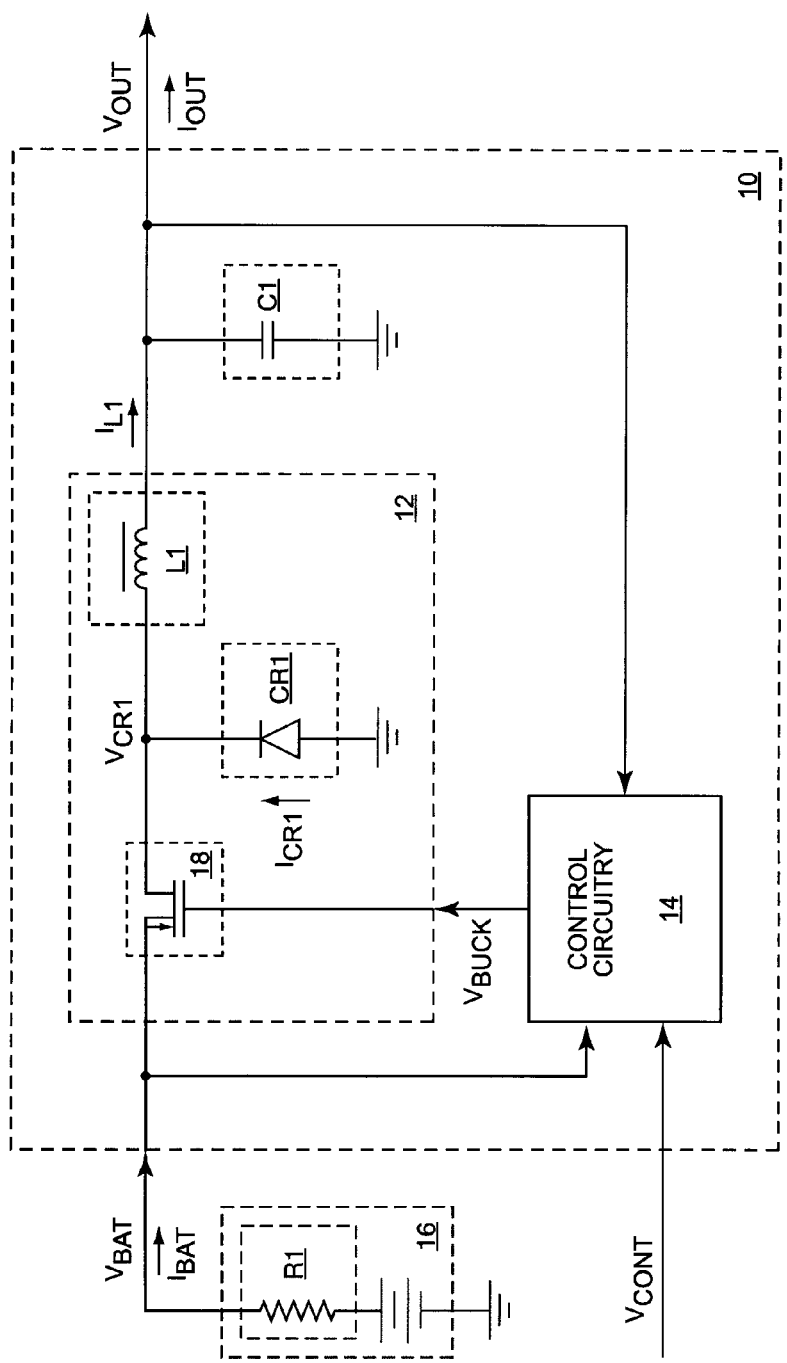
FIG. 2 shows details of buck conversion circuitry illustrated in FIG. 1.

FIGS. 3A, 3B, 3C, and 3D are graphs showing timing relationships between buck switching power supply signals illustrated in FIG. 2.

FIGS. 4A, 4B, 4C, 4D, and 4E are graphs showing timing relationships between buck switching power supply signals illustrated in FIG. 2.

Figure 5:
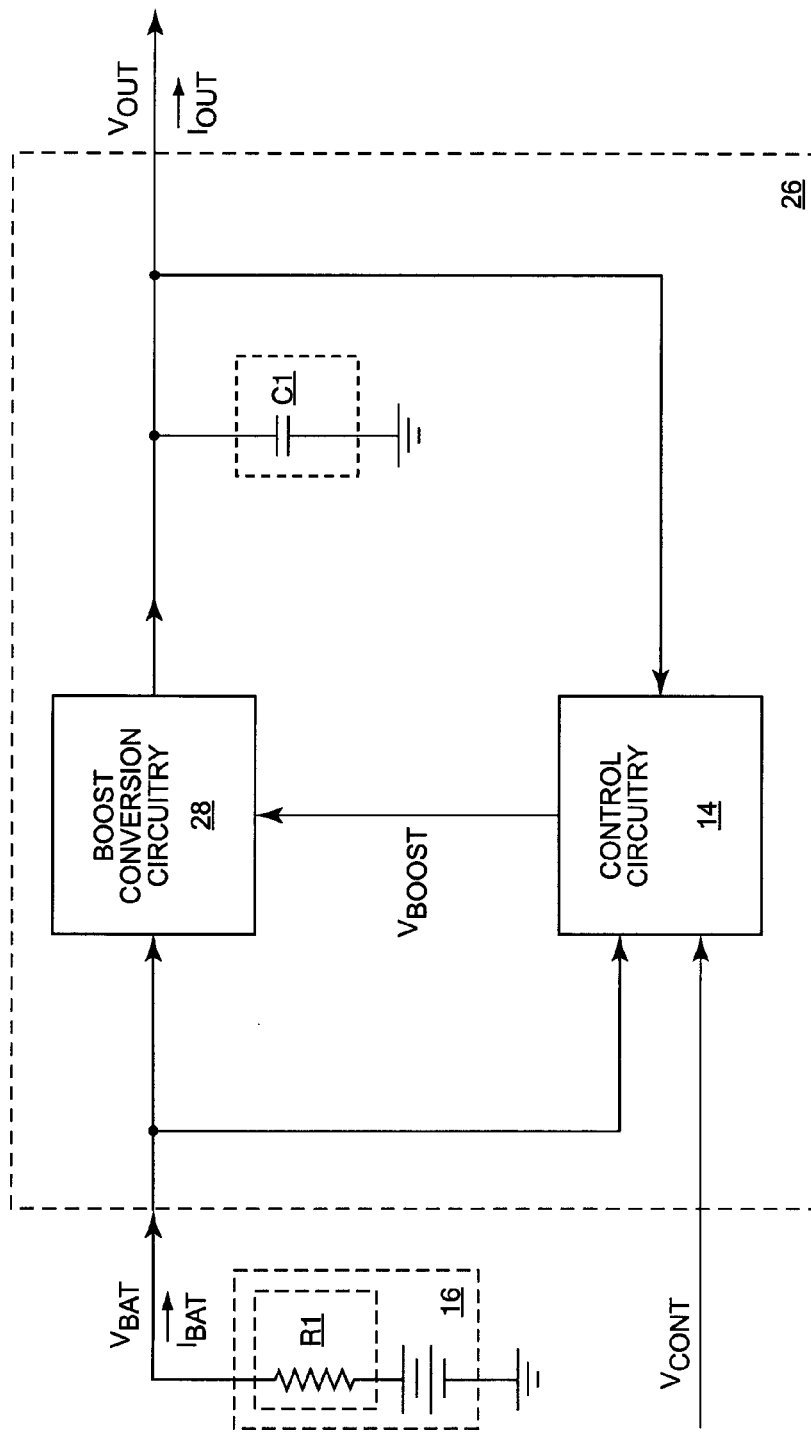

FIG. 5 shows a boost switching power supply according to the prior art.

Figure 6:
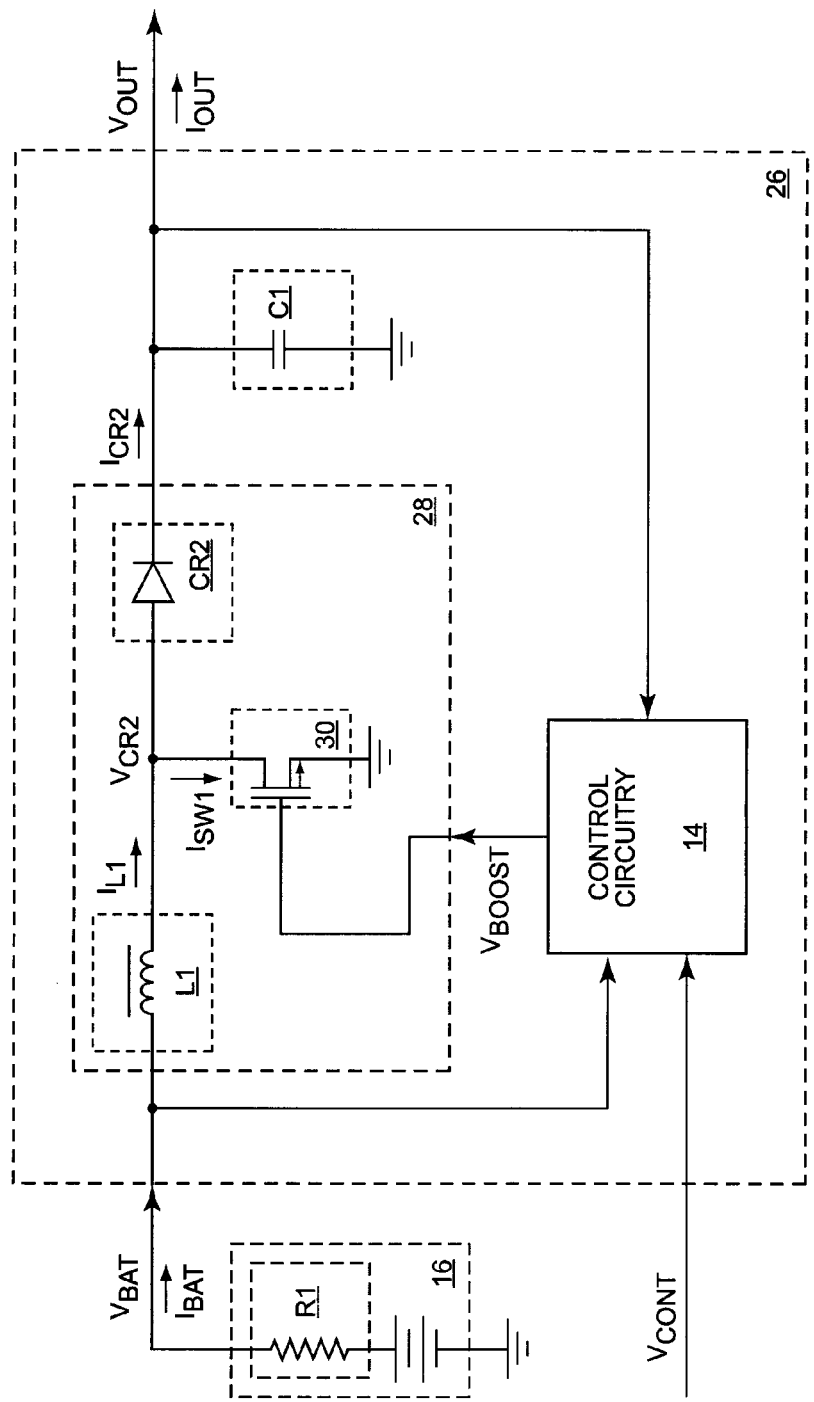

FIG. 6 shows details of boost conversion circuitry illustrated in FIG. 5.

Figure 7:
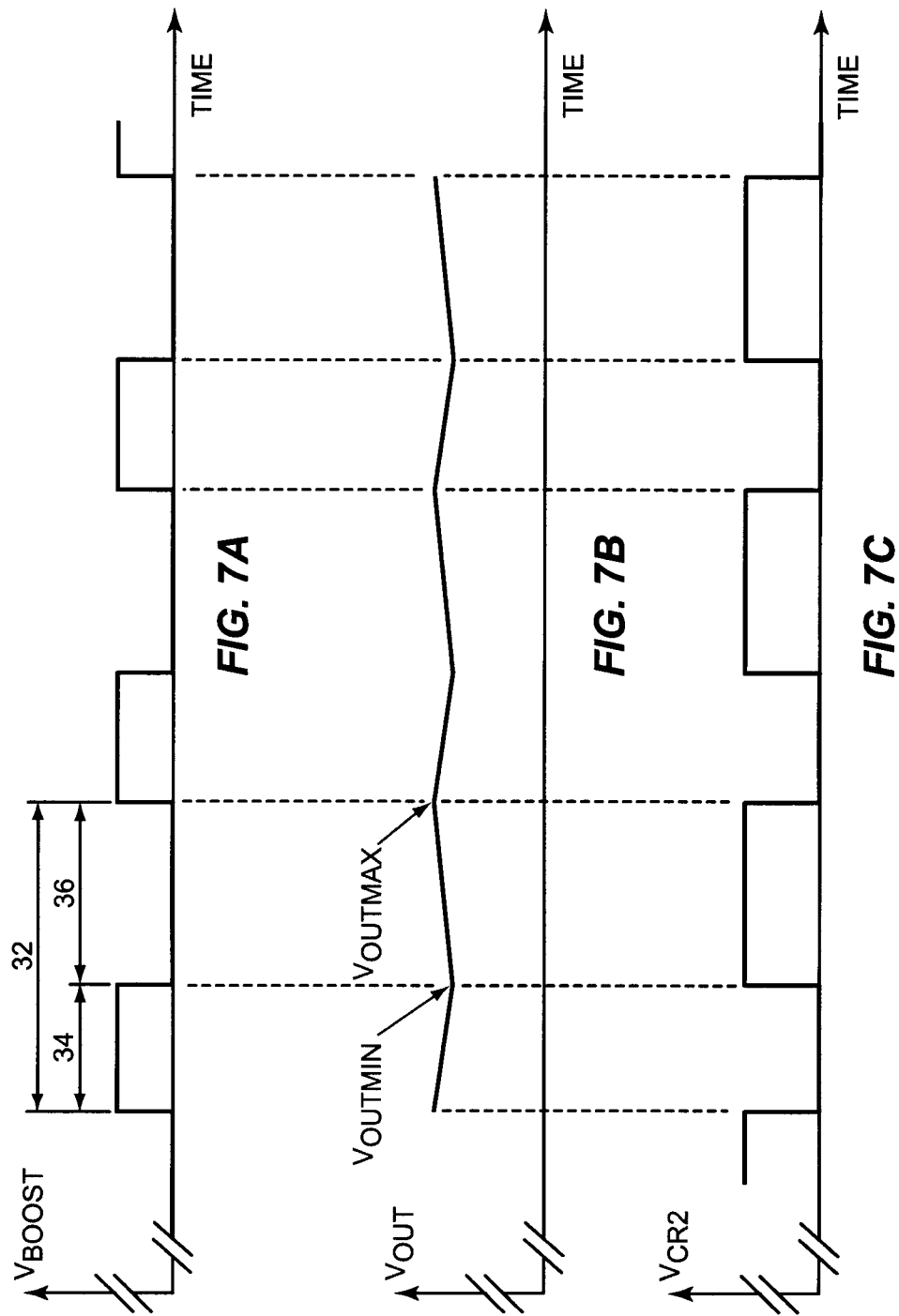

FIGS. 7A, 7B, and 7C are graphs showing timing relationships between boost switching power supply signals illustrated in FIG. 6.

FIGS. 8A, 8B, 8C, 8D, and 8E are graphs showing timing relationships between boost switching power supply signals illustrated in FIG. 6.

Figure 9:
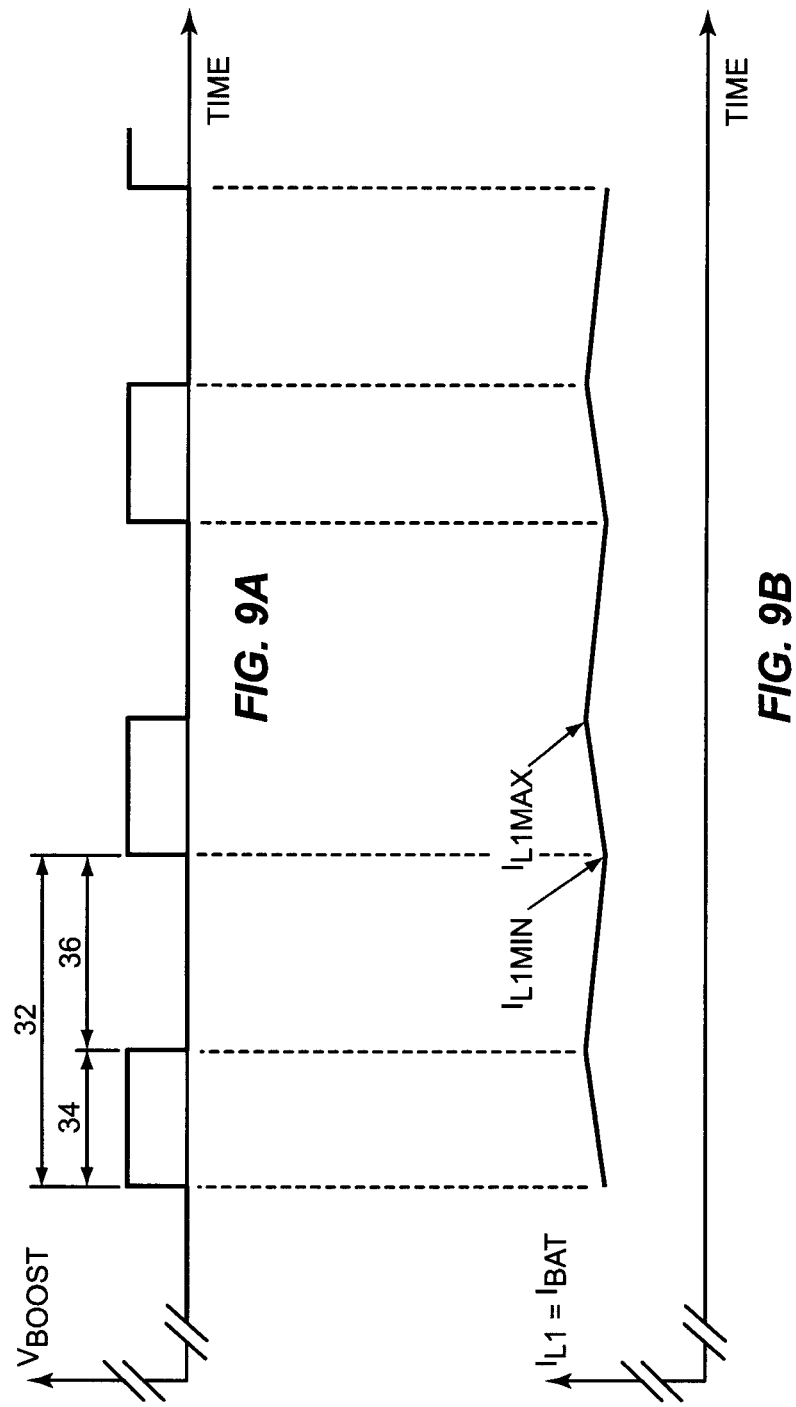

FIGS. 9A and 9B are graphs showing timing relationships between boost switching power supply signals illustrated in FIG. 6.

Figure 10:
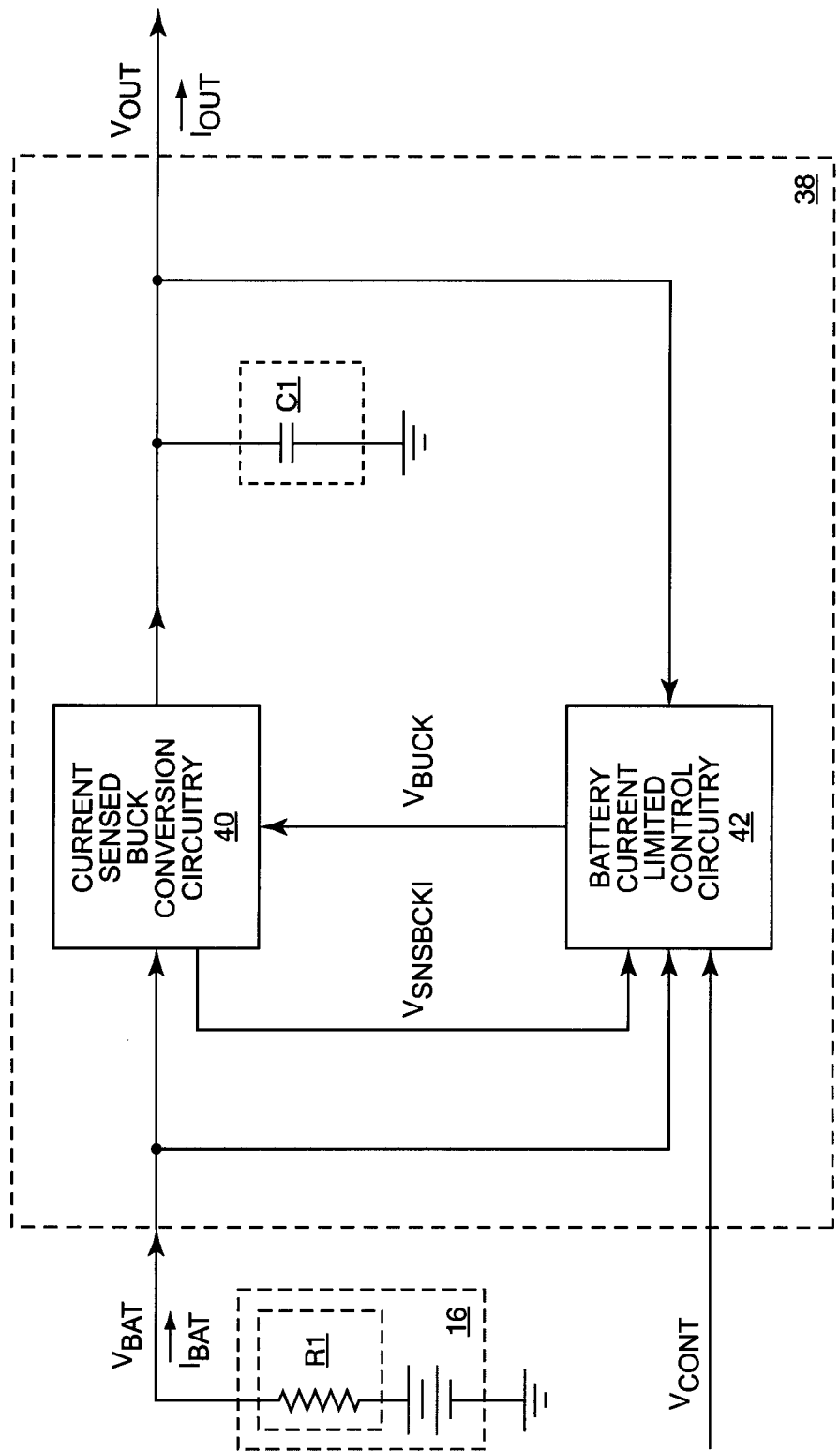

FIG. 10 shows a battery current limited buck switching power supply according to one embodiment of the present invention.

Figure 11:
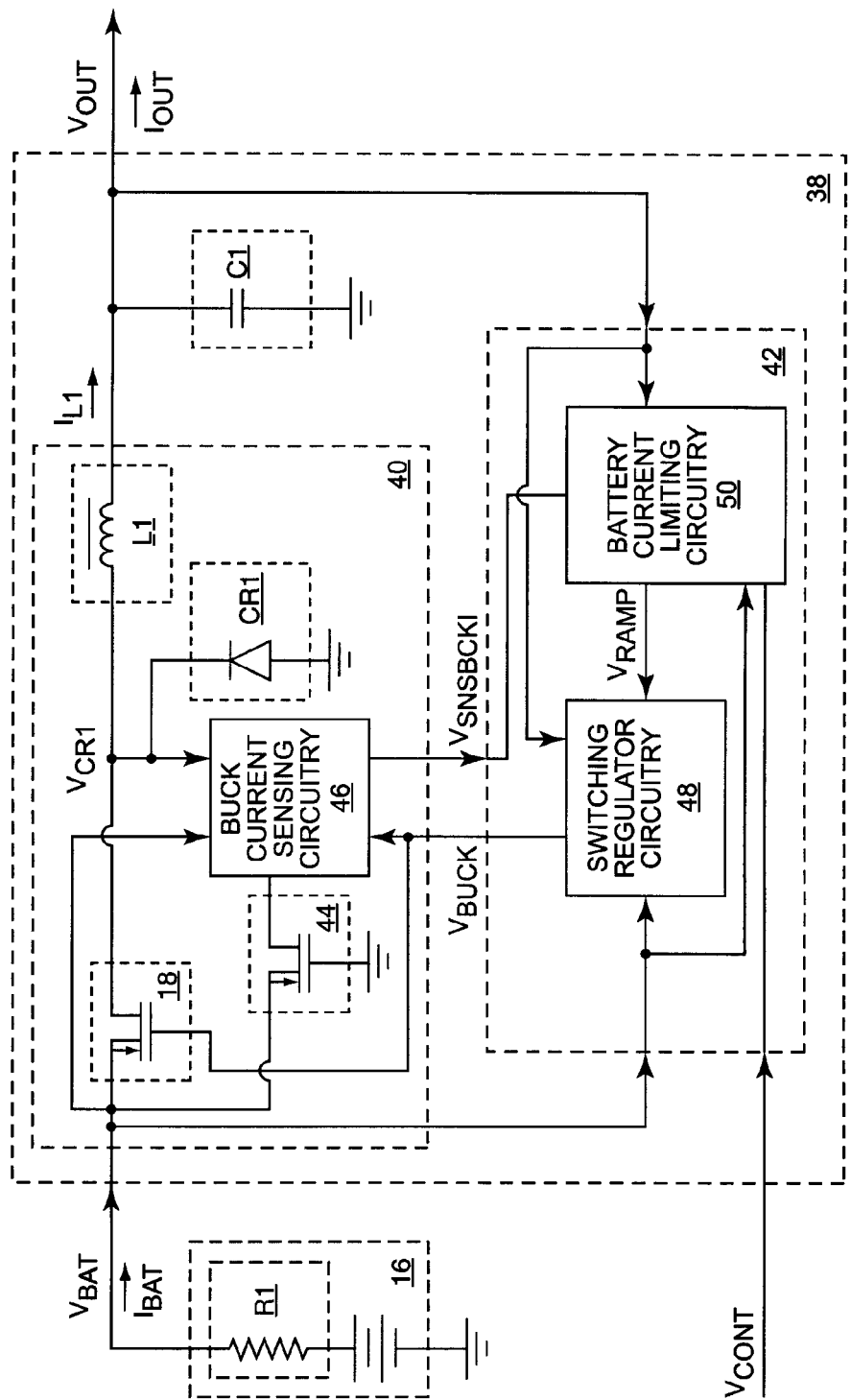

FIG. 11 shows details of current sensed buck conversion circuitry and battery current limited control circuitry illustrated in FIG. 10.

Figure 12:
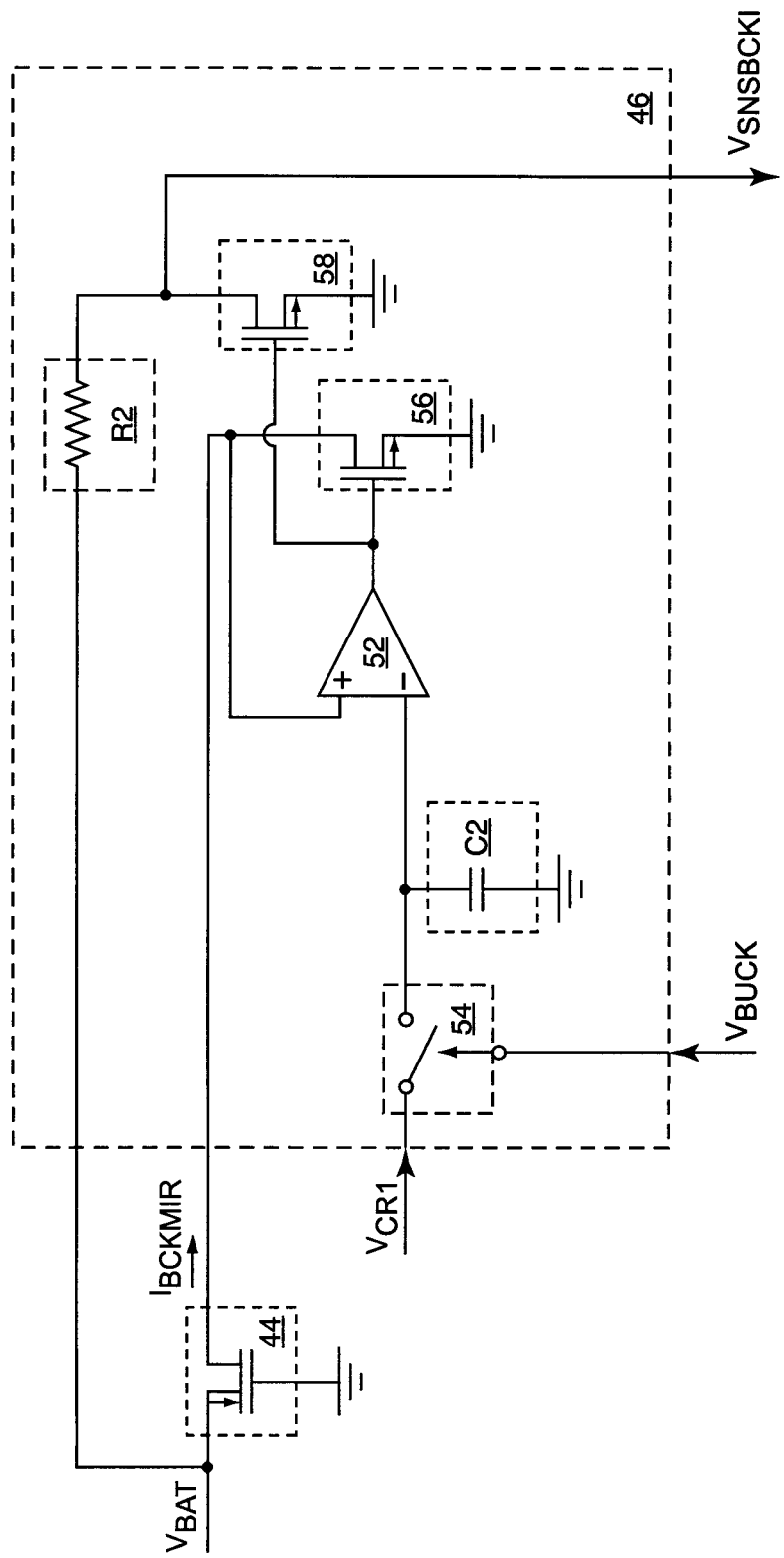

FIG. 12 shows details of buck current sensing circuitry illustrated in FIG. 11 according to one embodiment of the buck current sensing circuitry.

FIGS. 13A, 13B, 13C, 13D, and 13E are graphs showing timing relationships between buck switching power supply signals illustrated in FIGS. 11 and 12.

Figure 14:
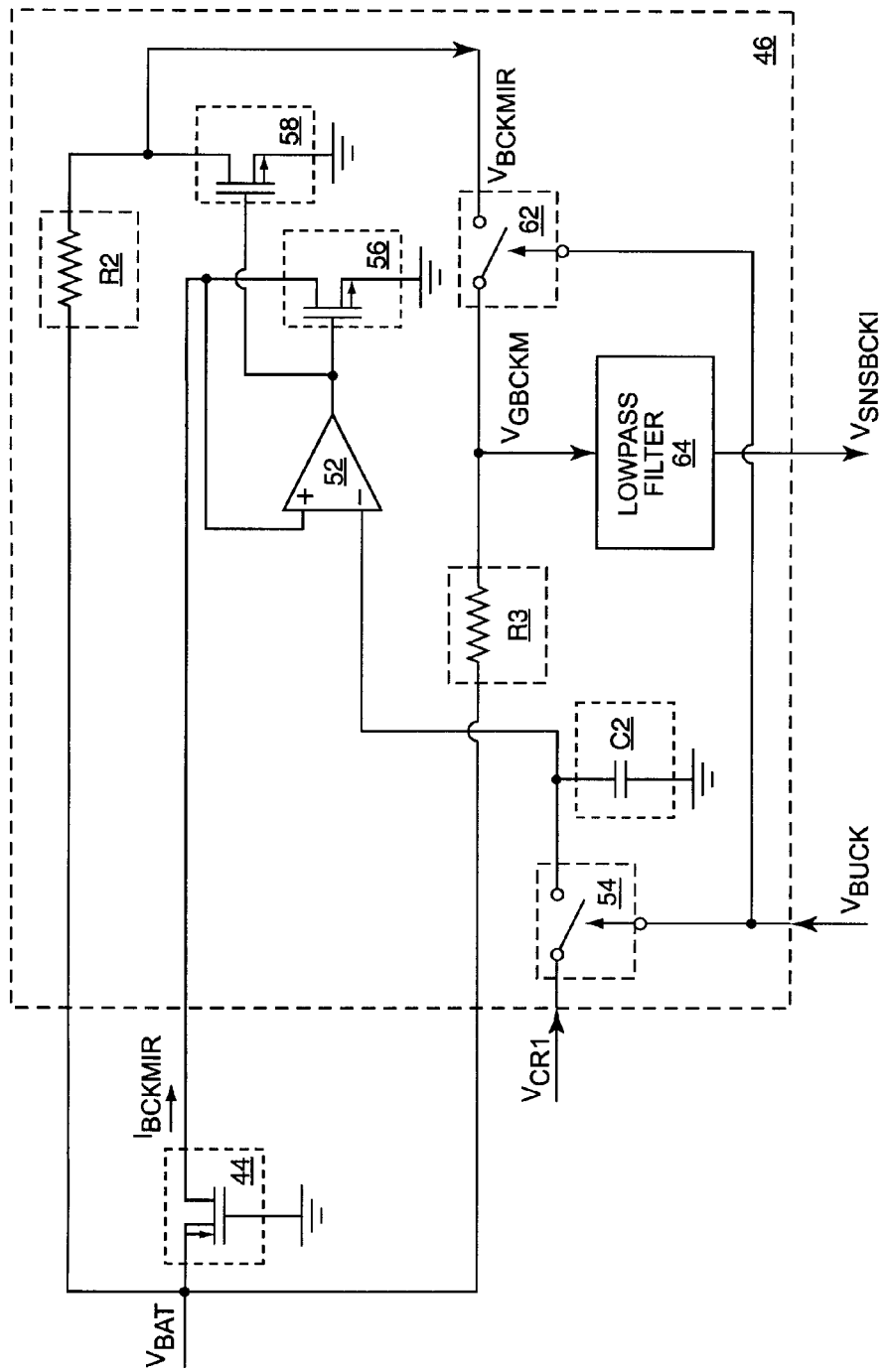

FIG. 14 shows details of the buck current sensing circuitry illustrated in FIG. 11 according to an alternate embodiment of the buck current sensing circuitry.

FIGS. 15A, 15B, 15C, 15D, and 15E are graphs showing timing relationships between buck switching power supply signals illustrated in FIGS. 11 and 14.

Figure 16:
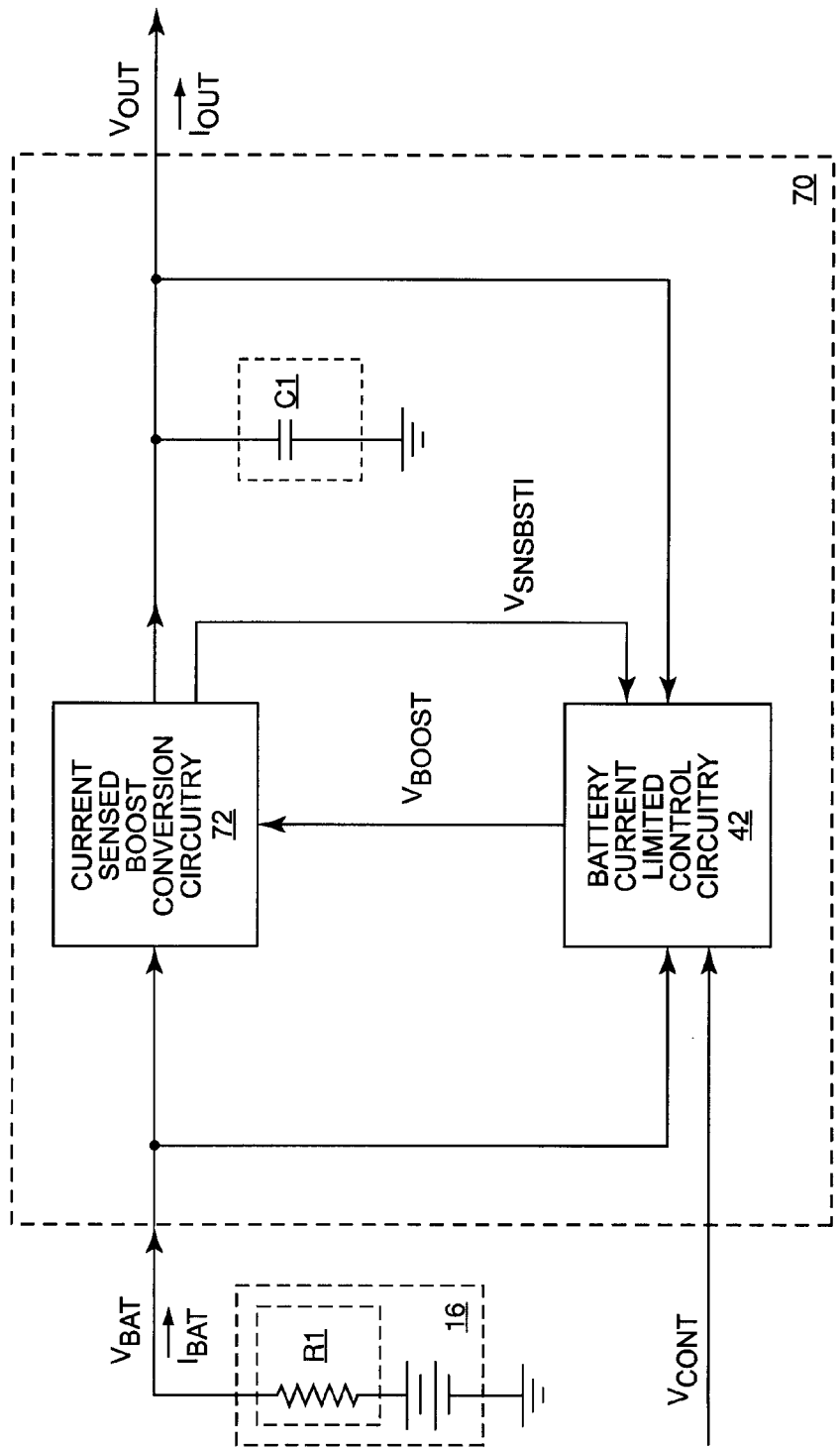

FIG. 16 shows a battery current limited boost switching power supply according to an alternate embodiment of the present invention.

Figure 17:
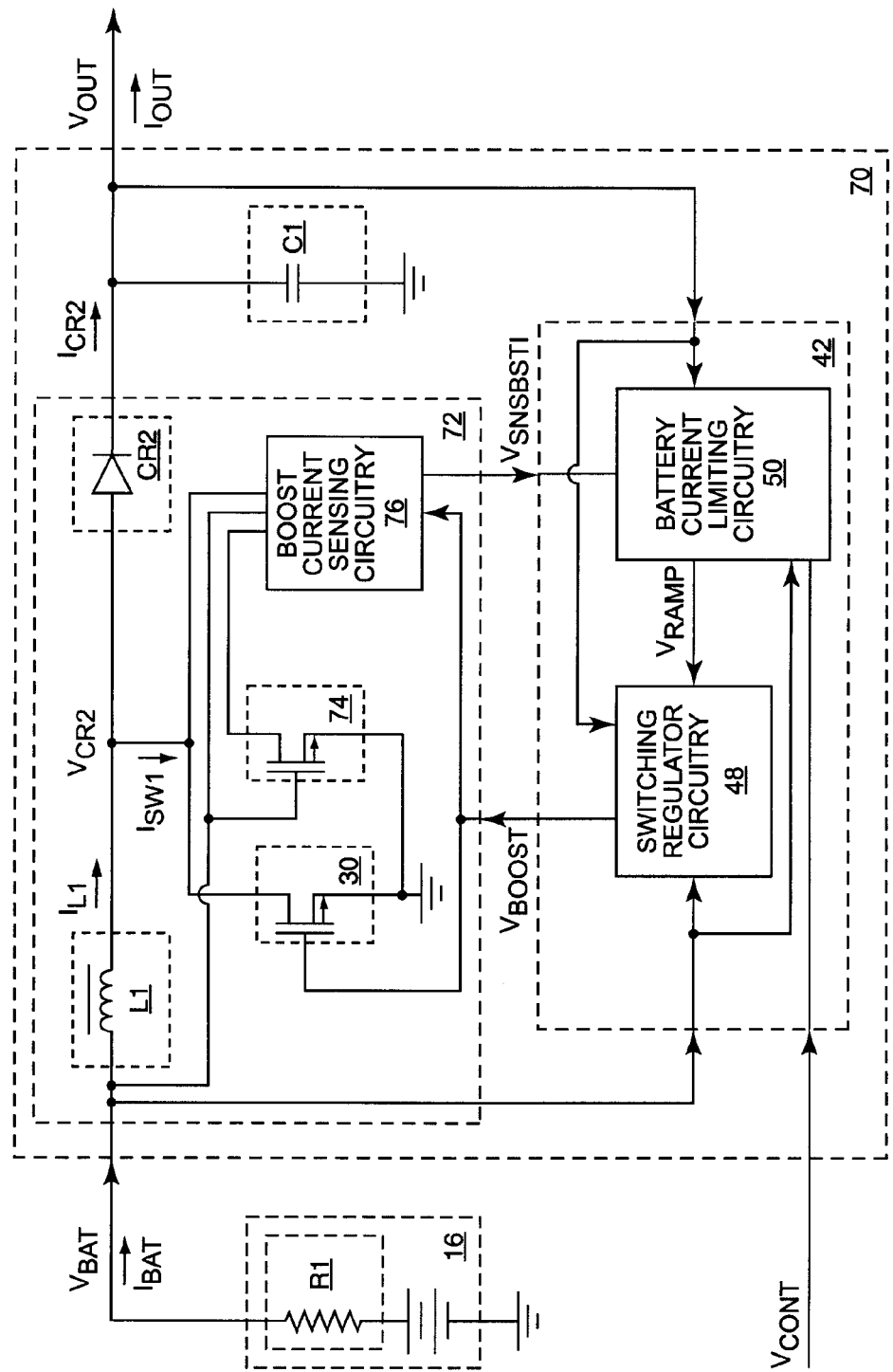

FIG. 17 shows details of current sensed boost conversion circuitry and battery current limited control circuitry illustrated in FIG. 16.

Figure 18:
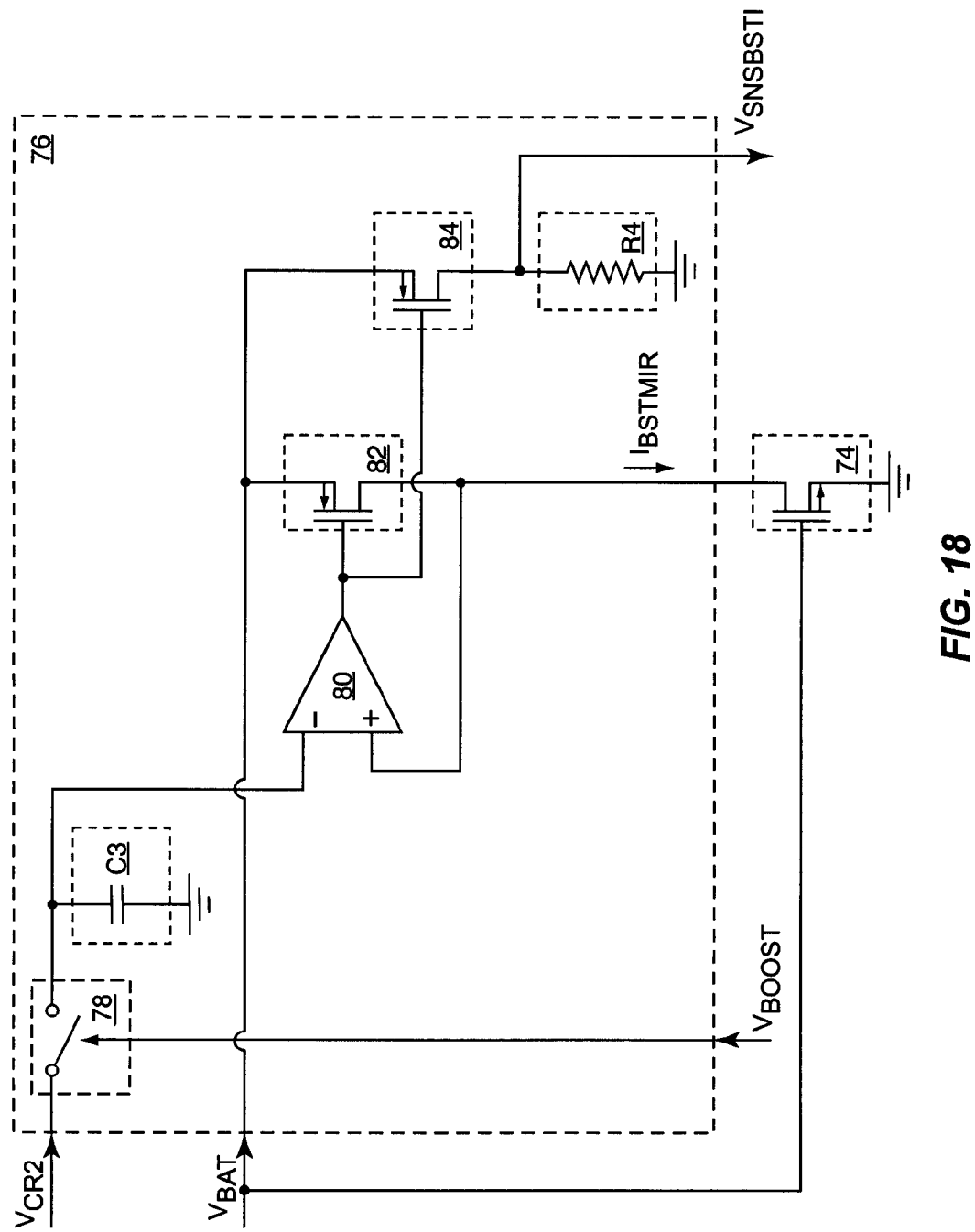

FIG. 18 shows details of boost current sensing circuitry illustrated in FIG. 17 according to one embodiment of the boost current sensing circuitry.

FIGS. 19A, 19B, 19C, 19D, and 19E are graphs showing timing relationships between boost switching power supply signals illustrated in FIGS. 17 and 18.

Figure 20:
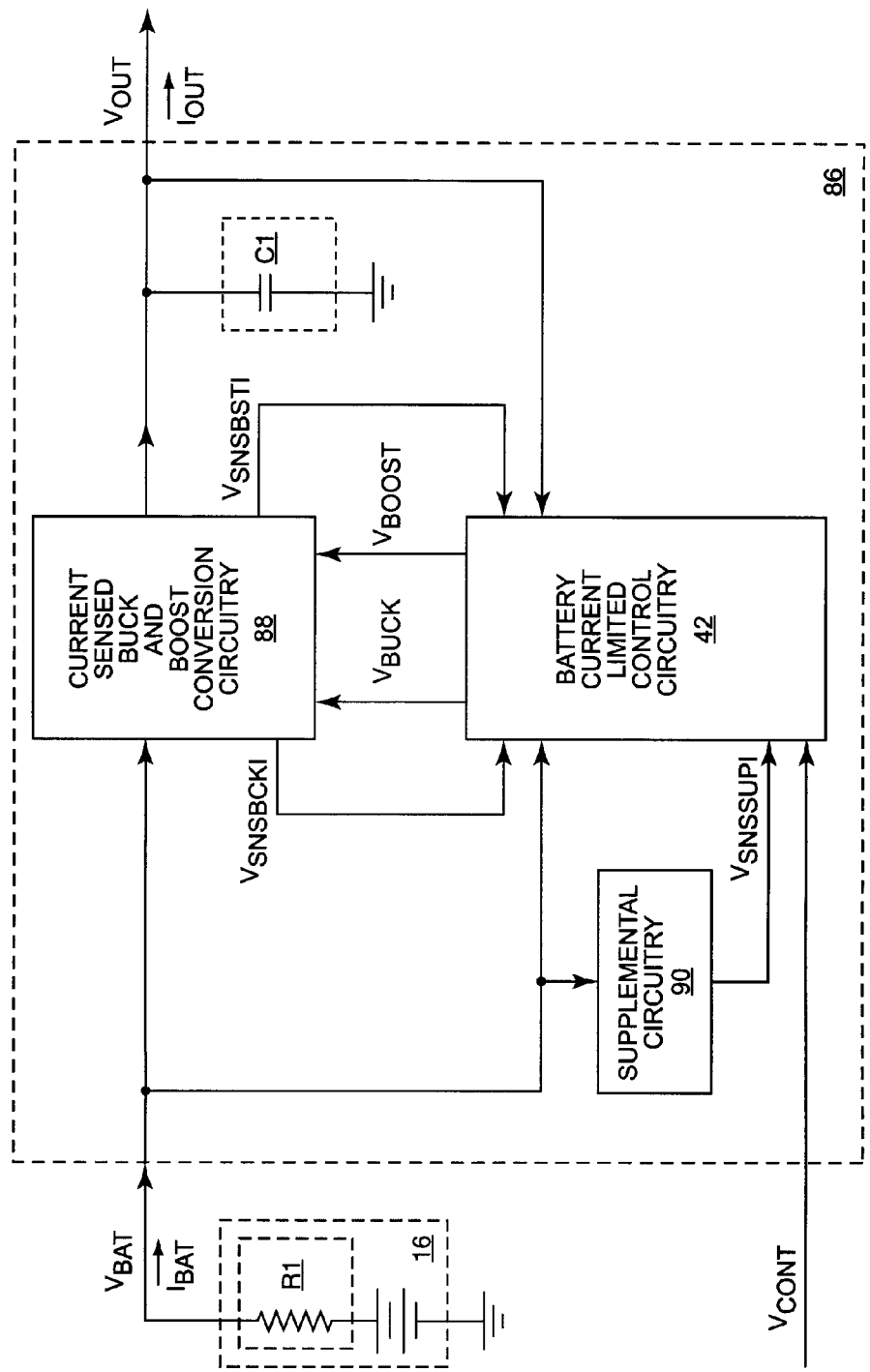

FIG. 20 shows a battery current limited buck and boost switching power supply according to an additional embodiment of the present invention.

Figure 21:
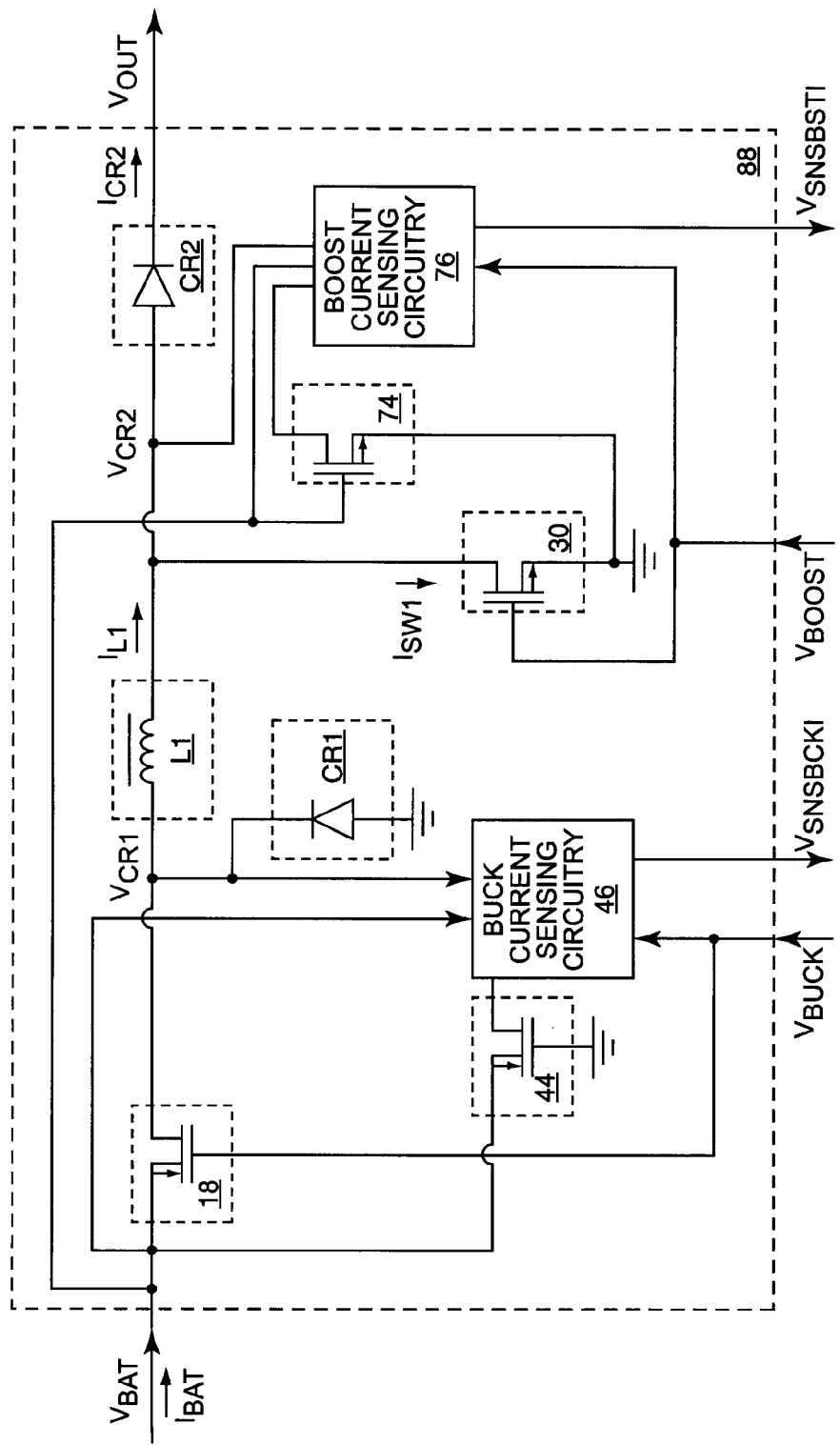

FIG. 21 shows details of current sensed buck and boost conversion circuitry according to a supplemental embodiment of the present invention.

Figure 22:
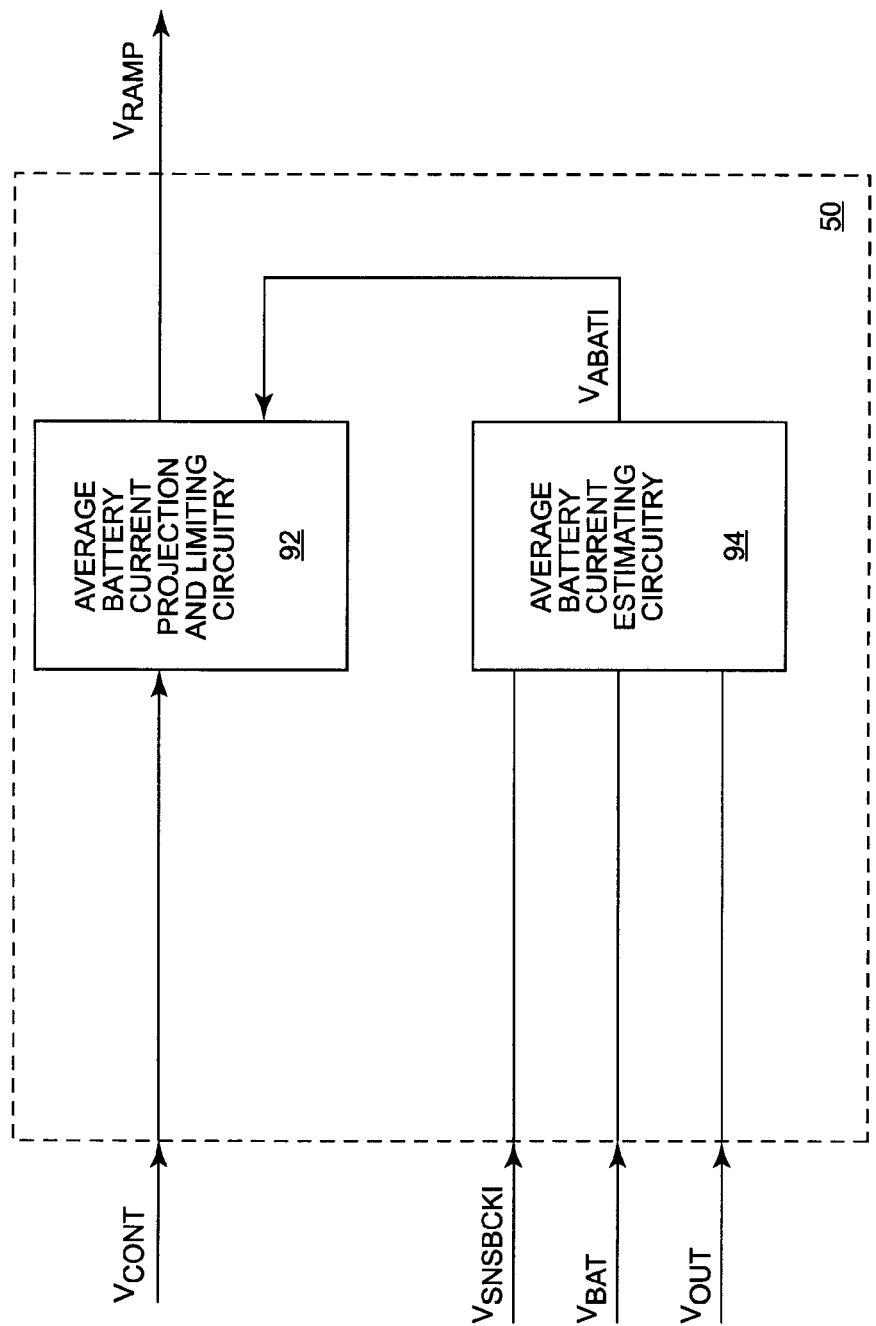

FIG. 22 shows details of battery current limiting circuitry illustrated in FIG. 11 according to one embodiment of the present invention.

Figure 23:
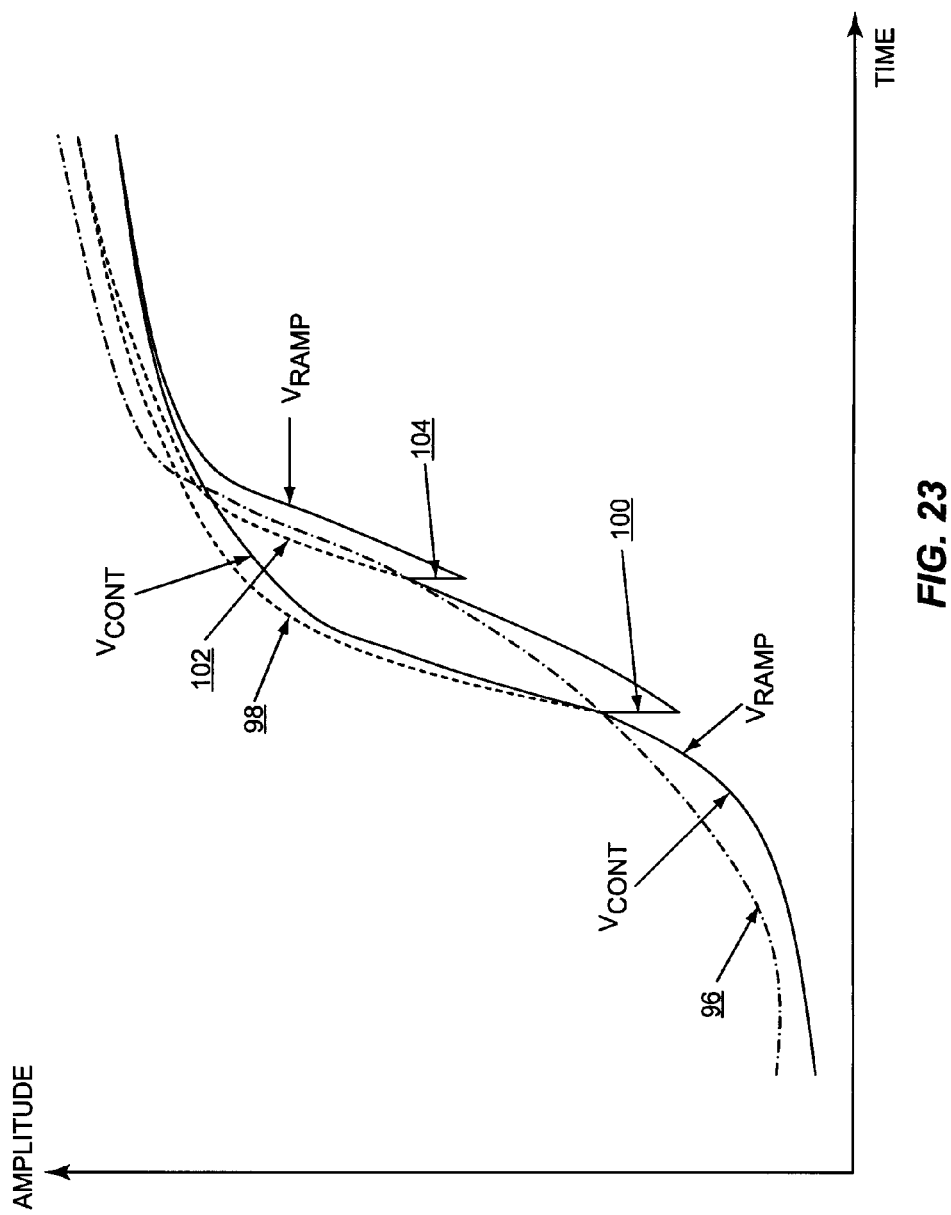

FIG. 23 is a graph showing timing relationships between buck switching power supply signals illustrated in FIG. 22.

Figure 24:
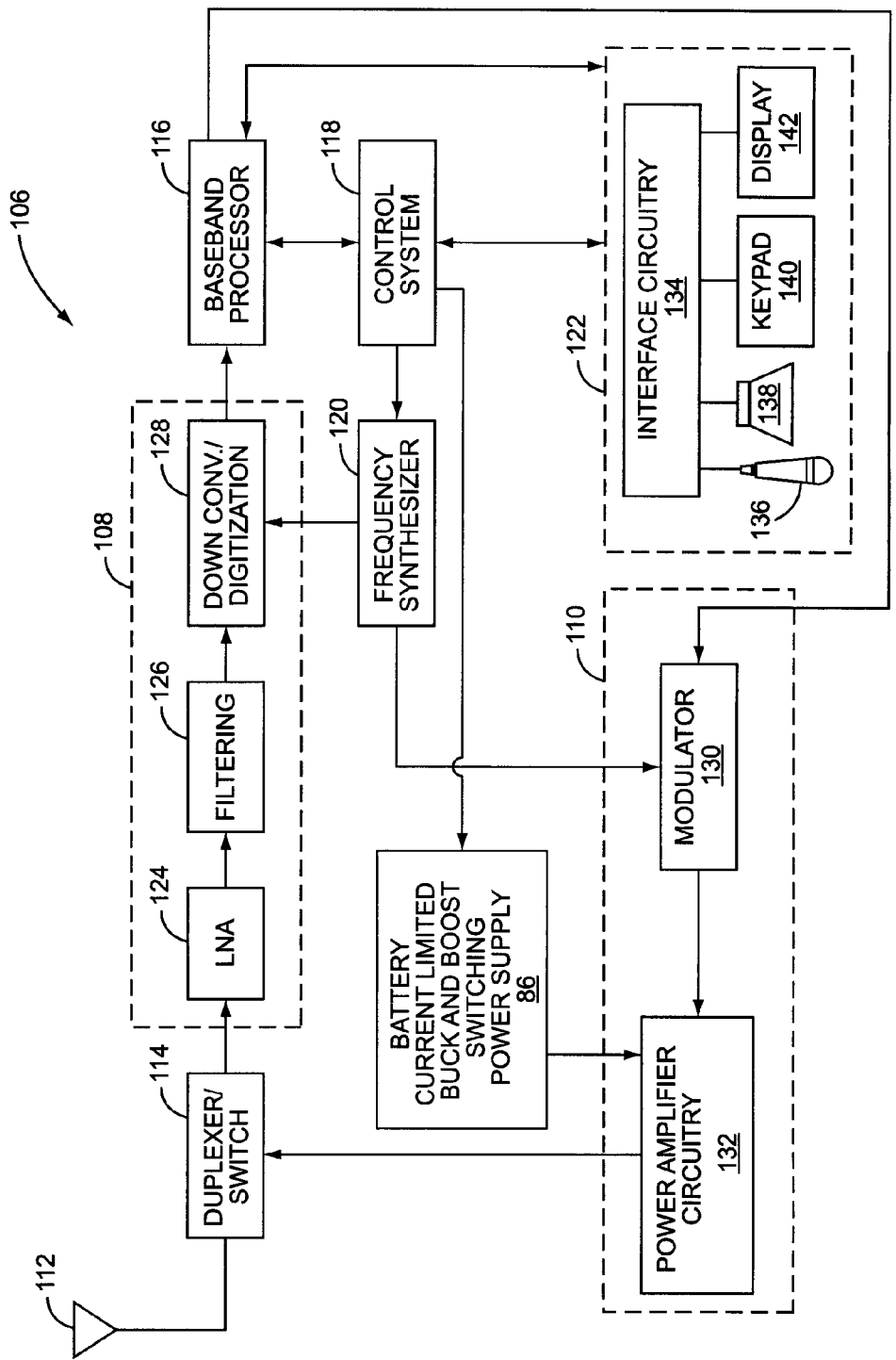

FIG. 24 shows an application example of the present invention used in a mobile terminal.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Before presenting detailed embodiments of the present invention, basic structure and behavior of a buck switching power supply and a boost switching power supply are presented to provide a foundation for describing the present invention.

The present invention relates to estimating a battery current supplied from a battery to a switching power supply, which provides a regulated output signal to a load, based on a switching power supply current in the switching power supply, and then controlling the regulated output signal to limit the battery current to within an acceptable threshold. The switching power supply current may be provided by one or more switching elements in the switching power supply. The switching elements may be mirrored to provide a mirrored switching power supply current, which is used to estimate the battery current. The estimated battery current may include an estimated average battery current, an estimated instantaneous battery current, or both. The switching power supply may be a buck switching power supply, a boost switching power supply, or a combination buck and boost switching power supply.

Figure 1:
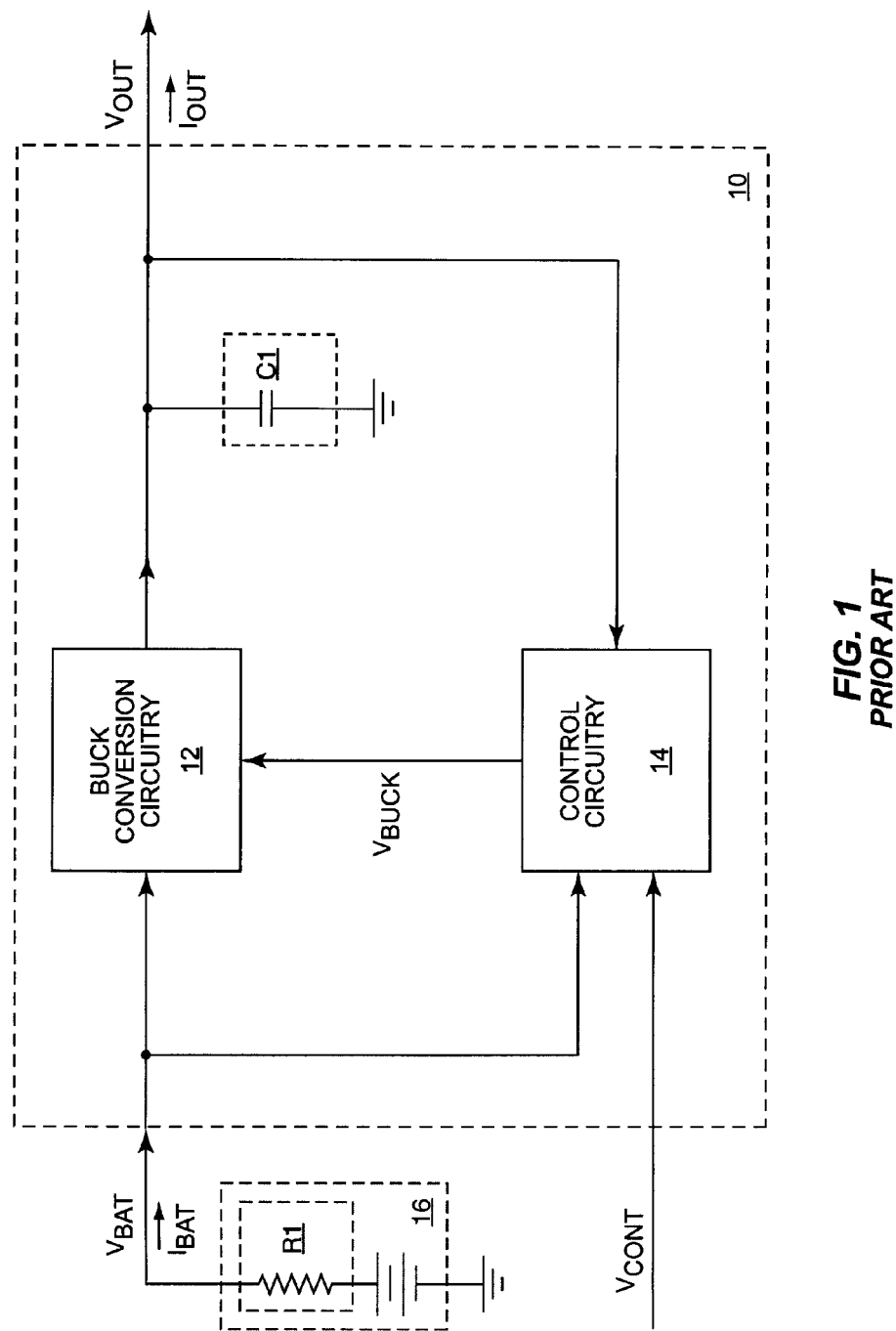
FIG. 1 shows a buck switching power supply according to the prior art.

FIG. 1 shows a buck switching power supply 10, according to the prior art. The buck switching power supply 10 includes buck conversion circuitry 12, control circuitry 14, and a first capacitive element C1. A battery 16 provides a battery voltage $V_{BAT}$ and a battery current $I_{BAT}$ to the buck conversion circuitry 12 and the control circuitry 14. The buck conversion circuitry 12 uses the battery voltage $V_{BAT}$ and a portion of the battery current $I_{BAT}$ to provide a regulated output signal to a load (not shown). The control circuitry 14 provides a buck switching signal $V_{BUCK}$ to the buck conversion circuitry 12. The regulated output signal includes an output voltage $V_{OUT}$ and an output current $I_{OUT}$, and is based on the battery voltage $V_{BAT}$, the battery current $I_{BAT}$, and the buck switching signal $V_{BUCK}$. The control circuitry 14 receives a control signal $V_{CONT}$ and senses the regulated output signal, and regulates the regulated output signal by providing the appropriate buck switching signal $V_{BUCK}$ based on the control signal $V_{CONT}$ and the sensed regulated output signal.

In an exemplary embodiment of the present invention, the control circuitry 14 regulates the output voltage $V_{OUT}$ by providing the appropriate buck switching signal $V_{BUCK}$ based on the control signal $V_{CONT}$ and a sensed output voltage $V_{OUT}$. The buck switching power supply 10 is used to provide the output voltage $V_{OUT}$ that is less than the battery voltage $V_{BAT}$. The first capacitive element C1 is coupled between the buck conversion circuitry 12 and ground, and may be used to filter the regulated output signal to provide a constant output voltage $V_{OUT}$ that has minimal ripple. The battery 16 has an internal resistance R1, which may cause changes in the battery voltage $V_{BAT}$ under different loading conditions. The control circuitry 14 may be powered from the battery 16. Typically, the portion of the battery current $I_{BAT}$ consumed by the control circuitry 14 is small compared to the portion of the battery current $I_{BAT}$ received by the buck conversion circuitry 12.

FIG. 2 shows details of the buck conversion circuitry 12 illustrated in FIG. 1. The buck conversion circuitry 12 includes a first P-type metal oxide semiconductor (PMOS) buck transistor element 18, a first diode element CR1, and a first inductive element L1. A source of the first PMOS buck transistor element 18 is coupled to the battery 16, a gate of the first PMOS buck transistor element 18 receives the buck switching signal $V_{BUCK}$ from the control circuitry 14, and a drain of the first PMOS buck transistor element 18 is coupled to a cathode of the first diode element CR1 and to a first terminal of the first inductive element L1. An anode of the first diode element CR1 is coupled to ground, and a second terminal of the first inductive element L1 is coupled to a first terminal of the first capacitive element C1 to provide the regulated output signal. A second terminal of the first capacitive element C1 is coupled to ground. The first inductive element L1 has a first inductive current $I_{L1}$, the first diode element CR1 has a first diode current $I_{CR1}$ and a first diode voltage $V_{CR1}$ at the cathode of the first diode element CR1.

Figure 3:
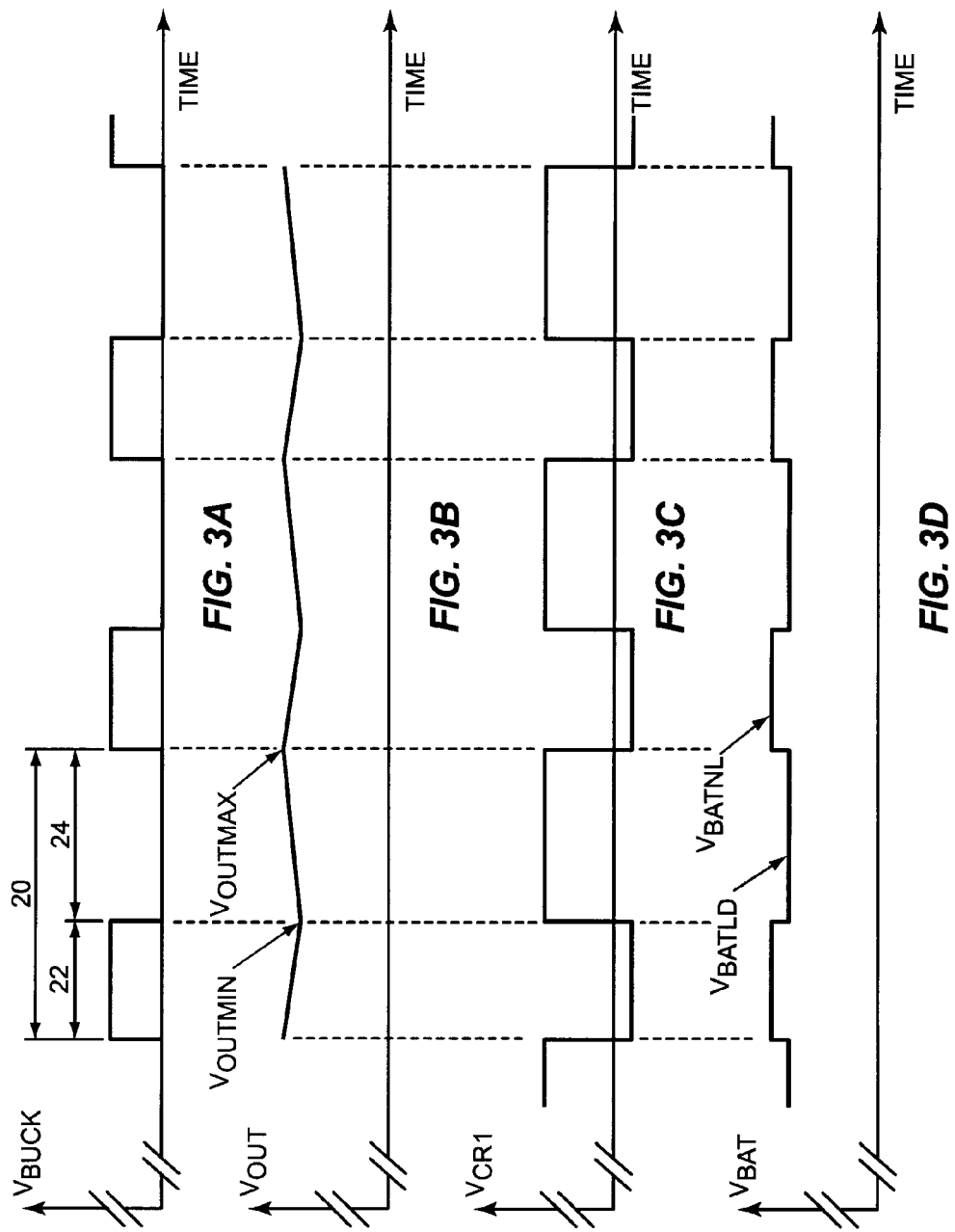

FIGS. 3A, 3B, 3C, and 3D are graphs showing timing relationships between buck switching power supply signals illustrated in FIG. 2. FIG. 3A shows the buck switching signal $V_{BUCK}$, which has a buck switching period 20 having a buck off phase 22 and a buck on phase 24. During the buck off phase 22, the first PMOS buck transistor element 18 is in an OFF state and during the buck on phase 24 the first PMOS buck transistor element 18 is in an ON state. Since the output voltage $V_{OUT}$ is less than the battery voltage $V_{BAT}$ during the buck on phase 24, a portion of the battery current $I_{BAT}$ flows through the first PMOS buck transistor element 18 and the first inductive element L1 to provide the first inductive current $I_{L1}$, which is divided to provide the output current $I_{OUT}$ and any currents needed by the first capacitive element C1 and a sense input to the control circuitry 14. If the voltage drop across the first PMOS buck transistor element 18 is sufficiently small, the output voltage $V_{OUT}$ is less than the first diode voltage $V_{CR1}$, thereby causing the first inductive current $I_{L1}$ to build in the first inductive element L1.

Since the first PMOS buck transistor element 18 is in the OFF state during the buck off phase 22, and since the first inductive current $I_{L1}$ in the first inductive element L1 cannot change instantaneously, the first inductive current $I_{L1}$ is provided by the first diode current $I_{CR1}$ from the first diode element CR1. Therefore, the first diode element CR1 must be forward biased to provide the first diode current $I_{CR1}$, and the first diode voltage $V_{CR1}$ must be slightly negative. Since the output voltage $V_{OUT}$ is positive relative to the first diode voltage $V_{CR1}$, the first inductive current $I_{L1}$ in the first inductive element L1 starts to drop. If the first inductive current $I_{L1}$ is not sufficient to provide the output current $I_{OUT}$, the first capacitive element C1 may provide current to reinforce the first inductive current $I_{L1}$. A duty-cycle of the buck switching power supply 10 may be based on a magnitude of the buck on phase 24 divided by a magnitude of the buck switching period 20. The control circuitry 14 may regulate the output voltage $V_{OUT}$, the output current $I_{OUT}$, or both by varying the duty-cycle of the buck switching power supply 10.

FIG. 3B shows the output voltage $V_{OUT}$, which is the voltage across the first capacitive element C1. Since the first capacitive element C1 may receive current during the buck on phase 24 and may provide current during the buck off phase 22, the voltage across the first capacitive element C1, which is the output voltage $V_{OUT}$ may increase during the buck on phase 24 to a maximum output voltage $V_{OUTMAX}$, and may decrease during the buck off phase 22 to a minimum output voltage $V_{OUTMIN}$. The difference between the maximum output voltage $V_{OUTMAX}$ and the minimum output voltage $V_{OUTMIN}$ may characterize a first capacitive element C1 ripple voltage (not shown), which may be minimized if the first capacitive element C1 is sufficiently large, if the first inductive element L1 is sufficiently large, or both.

FIG. 3C shows the first diode voltage $V_{CR1}$, which during the buck off phase 22 is slightly negative to forward bias the first diode element CR1 to provide the first diode current $I_{CR1}$ to the first inductive element L1. During the buck on phase 24, the first diode voltage $V_{CR1}$ is equal to the battery voltage $V_{BAT}$ less a voltage drop across the first PMOS buck transistor element 18, which is in the ON state.

FIG. 3D shows the battery voltage $V_{BAT}$, which during the buck off phase 22 is a non-loaded battery voltage $V_{BATNL}$ and during the buck on phase 24 is a loaded battery voltage $V_{BATLD}$. The loaded battery voltage $V_{BATLD}$ may be slightly less than the non-loaded battery voltage $V_{BATNL}$ due to a voltage drop across the internal resistance R1 when the battery 16 is providing current.

Figure 4:
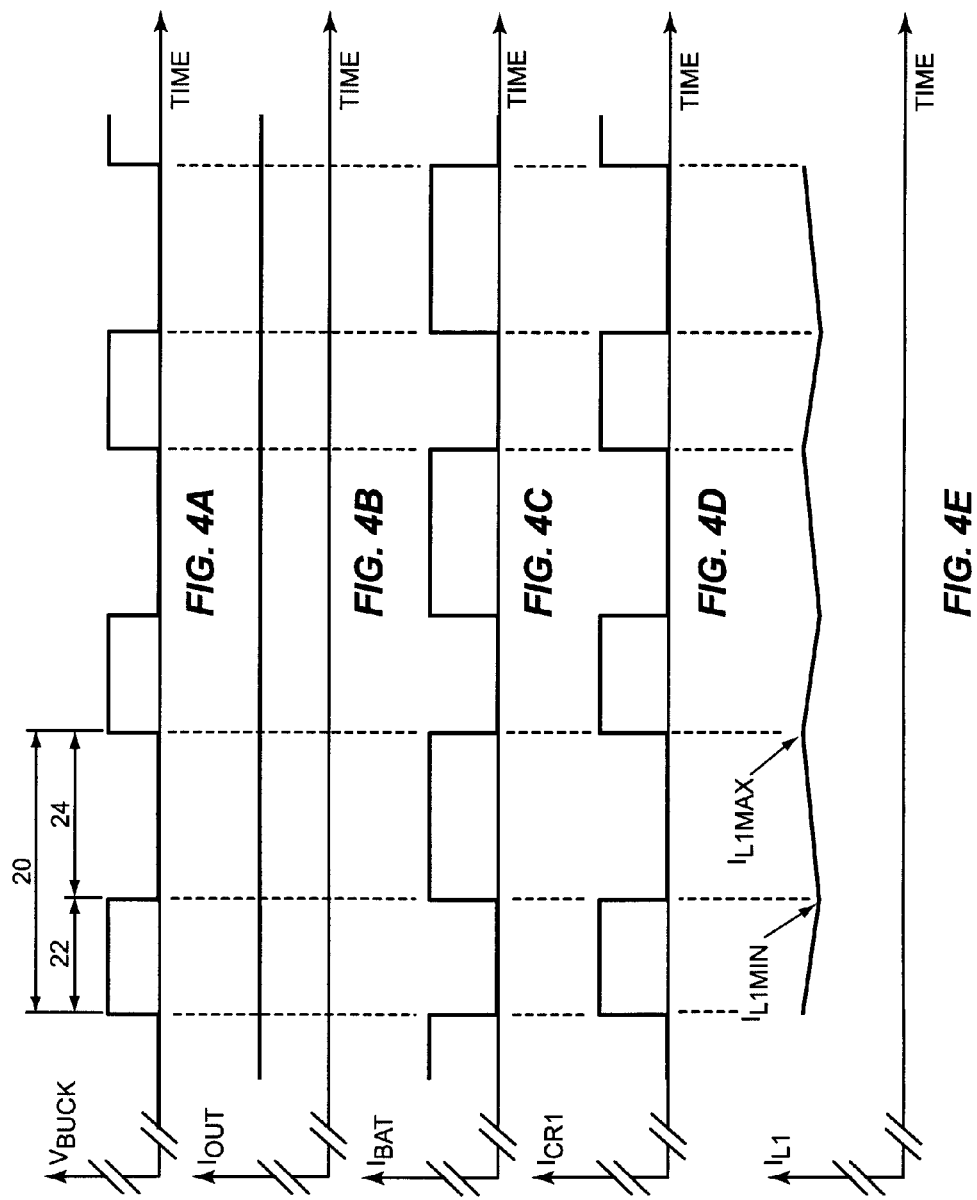

FIGS. 4A, 4B, 4C, 4D, and 4E are graphs showing timing relationships between buck switching power supply signals illustrated in FIG. 2. FIG. 4A is equivalent to FIG. 3A, which shows the buck switching signal $V_{BUCK}$, which has the buck switching period 20 having the buck off phase 22 and the buck on phase 24. FIG. 4B shows the output current $I_{OUT}$ as being constant over time; therefore, the load (not shown) presents a constant current load to the buck switching power supply 10. Other loads may be of varying currents; however, the described operating principals of the buck switching power supply 10 are applicable.

FIG. 4C shows the battery current $I_{BAT}$. As previously described, during the buck on phase 24, a portion of the battery current $I_{BAT}$ flows through the first PMOS buck transistor element 18 and the first inductive element L1 to provide the first inductive current $I_{L1}$, which is divided to provide the output current $I_{OUT}$. During the buck off phase 22, the first PMOS buck transistor element 18 is in the OFF state; therefore, the battery current $I_{BAT}$ drops to zero, or nearly zero.

FIG. 4D shows the first diode current $I_{CR1}$. As previously described, since during the buck off phase 22 the first PMOS buck transistor element 18 is in the OFF state, and since the first inductive current $I_{L1}$ in the first inductive element L1 cannot change instantaneously, the first inductive current $I_{L1}$ is provided by the first diode current $I_{CR1}$ from the first diode element CR1. During the buck on phase 24, the first diode element CR1 is reverse biased; therefore, the first diode current $I_{CR1}$ drops to about zero. The battery current $I_{BAT}$ and the first diode current $I_{CR1}$ combine to provide the output current $I_{OUT}$.

FIG. 4E shows the first inductive current $I_{L1}$ in the first inductive element L1. As previously discussed, during the buck on phase 24, if the voltage drop across the first PMOS buck transistor element 18 is sufficiently small, the output voltage $V_{OUT}$ is less than the first diode voltage $V_{CR1}$, thereby causing the first inductive current $I_{L1}$ to build in the first inductive element L1. The first inductive current $I_{L1}$ may build to a maximum first inductive current $I_{L1MAX}$. As previously discussed, during the buck off phase 22, since the output voltage $V_{OUT}$ is positive relative to the first diode voltage $V_{CR1}$, the first inductive current $I_{L1}$ in the first inductive element L1 starts to drop. If the first inductive current $I_{L1}$ is not sufficient to provide the output current $I_{OUT}$, the first capacitive element C1 may provide current to reinforce the first inductive current $I_{L1}$. The first inductive current $I_{L1}$ may drop to a minimum first inductive current $I_{L1MIN}$. The difference between the maximum first inductive current $I_{L1MAX}$ and the minimum first inductive current $I_{L1MIN}$ may characterize a first inductive element L1 ripple current (not shown), which may be minimized if the first inductive element L1 is sufficiently large.

FIG. 5 shows a boost switching power supply 26 according to the prior art. The boost switching power supply 26 includes boost conversion circuitry 28, the control circuitry 14, and the first capacitive element C1. The battery 16 provides the battery voltage $V_{BAT}$ and the battery current $I_{BAT}$ to the boost conversion circuitry 28 and the control circuitry 14. The boost conversion circuitry 28 uses the battery voltage $V_{BAT}$ and a portion of the battery current $I_{BAT}$ to provide a regulated output signal to a load (not shown). The regulated output signal includes the output voltage $V_{OUT}$ and the output current $I_{OUT}$, and is based on the battery voltage $V_{BAT}$, the battery current $I_{BAT}$, and a boost switching signal $V_{BOOST}$. The control circuitry 14 receives the control signal $V_{CONT}$ and senses the regulated output signal, and regulates the regulated output signal by providing the appropriate boost switching signal $V_{BOOST}$ based on the control signal $V_{CONT}$ and the sensed regulated output signal. In an exemplary embodiment of the present invention, the control circuitry 14 regulates the output voltage $V_{OUT}$ by providing the appropriate boost switching signal $V_{BOOST}$ based on the control signal $V_{CONT}$ and a sensed output voltage $V_{OUT}$. The boost switching power supply 26 is used to provide the output voltage $V_{OUT}$ that is greater than the battery voltage $V_{BAT}$.

The first capacitive element C1 is coupled between the boost conversion circuitry 28 and ground, and may be used to filter the regulated output signal to provide a constant output voltage $V_{OUT}$ that has minimal ripple. The battery 16 has the internal resistance R1, which may cause changes in the battery voltage $V_{BAT}$ under different loading conditions. The control circuitry 14 may be powered from the battery 16. Typically, the portion of the battery current $I_{BAT}$ consumed by the control circuitry 14 is small compared to the portion of the battery current $I_{BAT}$ received by the boost conversion circuitry 28.

FIG. 6 shows details of the boost conversion circuitry 28 illustrated in FIG. 5. The boost conversion circuitry 28 includes a first N-type metal oxide semiconductor (NMOS) boost transistor element 30, a second diode element CR2, and the first inductive element L1. A drain of the first NMOS boost transistor element 30 is coupled to a first terminal of the first inductive element L1 and to an anode of the second diode element CR2, a gate of the first NMOS boost transistor element 30 receives the boost switching signal $V_{BOOST}$ from the control circuitry 14, and a source of the first NMOS boost transistor element 30 is coupled to ground. A second terminal of the first inductive element L1 is coupled to the battery 16, and a cathode of the second diode element CR2 is coupled to a first terminal of the first capacitive element C1 to provide the regulated output signal. A second terminal of the first capacitive element C1 is coupled to ground. The first inductive element L1 has the first inductive current $I_{L1}$, the second diode element CR2 has a second diode current $I_{CR2}$ and a second diode voltage $V_{CR2}$ at the anode of the second diode element CR2, and the first NMOS boost transistor element 30 has a first switching current $I_{SW1}$.

FIGS. 7A, 7B, and 7C are graphs showing timing relationships between boost switching power supply signals illustrated in FIG. 6. FIG. 7A shows the boost switching signal $V_{BOOST}$, which has a boost switching period 32 having a boost on phase 34 and a boost off phase 36. During the boost off phase 36, the first NMOS boost transistor element 30 is in an OFF state and during the boost on phase 34 the first NMOS boost transistor element 30 is in an ON state. During the boost on phase 34, a portion of the battery current $I_{BAT}$ flows through the first inductive element L1 and the first NMOS boost transistor element 30 to provide the first inductive current $I_{L1}$ and the first switching current $I_{SW1}$. The resulting voltage drop across the first inductive element L1 causes the first inductive current $I_{L1}$ to build. Since the output voltage $V_{OUT}$ is greater than the battery voltage $V_{BAT}$, the second diode element CR2 is reverse biased. Therefore, the output current $I_{OUT}$ is provided by the first capacitive element C1.

Since the first NMOS boost transistor element 30 is in the OFF state during the boost off phase 36, and since the first inductive current $I_{L1}$ in the first inductive element L1 cannot change instantaneously, the first inductive current $I_{L1}$ forward biases the second diode element CR2 and provides the second diode current $I_{CR2}$, which is divided to provide the output current $I_{OUT}$, current to restore any charge depleted from the first capacitive element C1 during the boost on phase 34, and current to a sense input (not shown) to the control circuitry 14. When the second diode element CR2 is forward biased, the second diode voltage $V_{CR2}$ is slightly higher than the output voltage $V_{OUT}$, and since the output voltage $V_{OUT}$ is greater than the battery voltage $V_{BAT}$, then the second diode voltage $V_{CR2}$ is greater than the battery voltage $V_{BAT}$, which causes the first inductive current $I_{L1}$ to drop. A duty-cycle of the boost switching power supply 26 may be based on a magnitude of the boost on phase 34 divided by a magnitude of the boost switching period 32. The control circuitry 14 may regulate the output voltage $V_{OUT}$, the output current $I_{OUT}$, or both by varying the duty-cycle of the boost switching power supply 26.

FIG. 7B shows the output voltage $V_{OUT}$, which is the voltage across the first capacitive element C1. Since the first capacitive element C1 may receive current during the boost on phase 34 and may provide current during the boost off phase 36, the voltage across the first capacitive element C1, which is the output voltage $V_{OUT}$, may decrease during the boost on phase 34 to a minimum output voltage $V_{OUTMIN}$, and may increase during the boost off phase 36 to a maximum output voltage $V_{OUTMAX}$. The difference between the maximum output voltage $V_{OUTMAX}$ and the minimum output voltage $V_{OUTMIN}$ may characterize a first capacitive element C1 ripple voltage (not shown), which may be minimized if the first capacitive element C1 is sufficiently large.

FIG. 7C shows the second diode voltage $V_{CR2}$, which during the boost off phase 36 is positive to forward bias the second diode element CR2 to provide the second diode current $I_{CR2}$. During the boost on phase 34, the second diode voltage $V_{CR2}$ is equal to the voltage drop across the first NMOS boost transistor element 30, which is in the ON state. Therefore, the second diode voltage $V_{CR2}$ is near zero.

Figure 8:
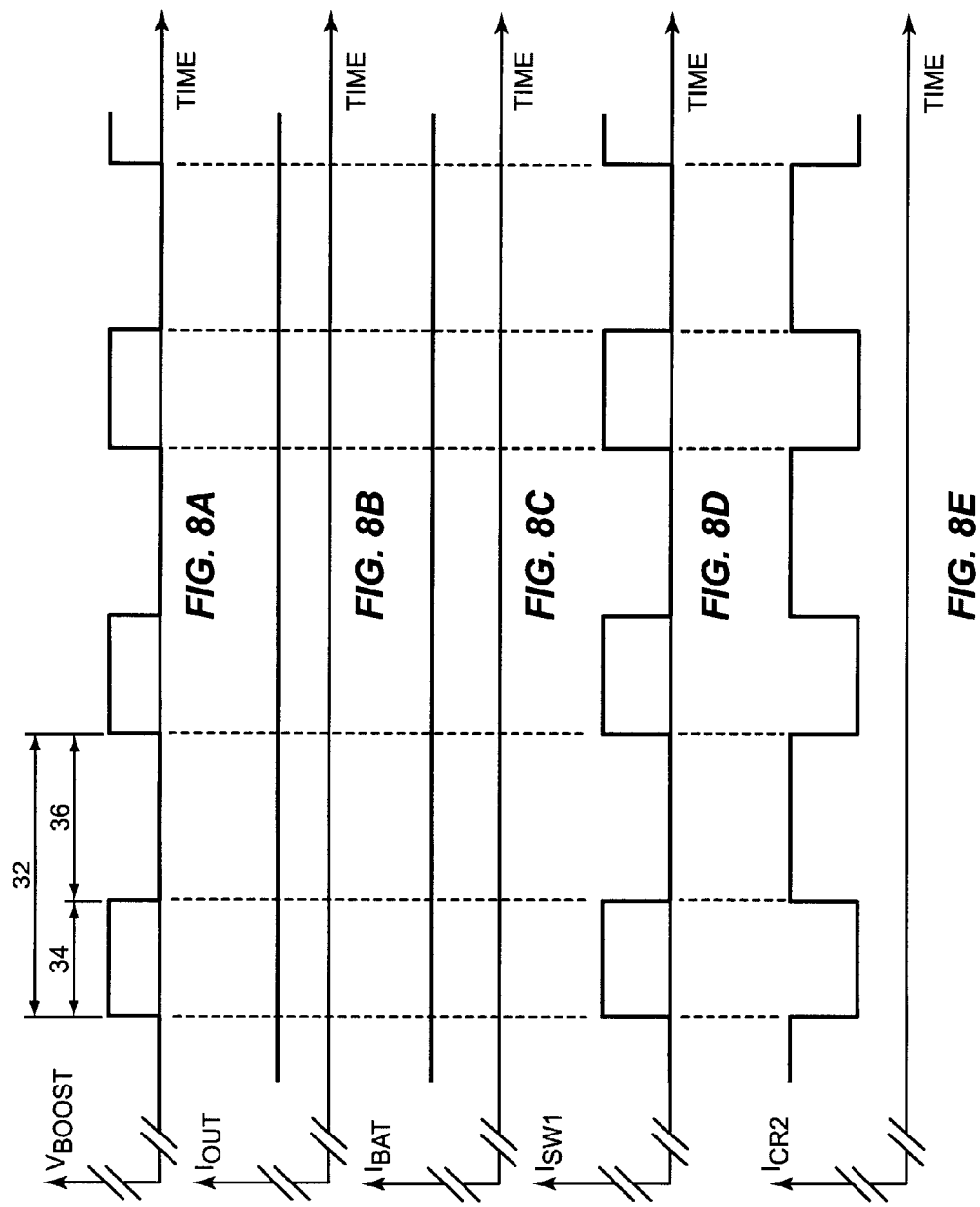

FIGS. 8A, 8B, 8C, 8D, and 8E are graphs showing timing relationships between boost switching power supply signals illustrated in FIG. 6. FIG. 8A is equivalent to FIG. 7A, which shows the boost switching signal $V_{BOOST}$, which has the boost switching period 32 having the boost off phase 36 and the boost on phase 34. FIG. 8B shows the output current $I_{OUT}$ as being constant over time; therefore, the load (not shown) presents a constant current load to the boost switching power supply 26. Other loads may be of varying currents; however, the described operating principals of the boost switching power supply 26 are applicable.

FIG. 8C shows the battery current $I_{BAT}$. As previously described, during the boost on phase 34 and during the boost off phase 36, a portion of the battery current $I_{BAT}$ flows through the first inductive element L1 to provide the first inductive current $I_{L1}$; therefore, since the first inductive current $I_{L1}$ may be relatively constant, the battery current $I_{BAT}$ may be relatively constant. However, during the boost off phase 36, since the first inductive current $I_{L1}$ provides the second diode current $I_{CR2}$, which is divided to provide the output current $I_{OUT}$ and current to restore any charge depleted from the first capacitive element C1 during the boost on phase 34, then the battery current $I_{BAT}$ is greater than the output current $I_{OUT}$.

FIGS. 8D and 8E show the first switching current $I_{SW1}$ and the second diode current $I_{CR2}$, respectively. As previously described, during the boost on phase 34, the first NMOS boost transistor element 30 is in the ON state and the second diode element CR2 is reverse biased; therefore, the second diode current $I_{CR2}$ is about zero and the first switching current $I_{SW1}$ is about equal to the first inductive current $I_{L1}$, which is about equal to the battery current $I_{BAT}$. During the boost off phase 36, the first NMOS boost transistor element 30 is in the OFF state, and since the first inductive current $I_{L1}$ in the first inductive element L1 cannot change instantaneously, the first inductive current $I_{L1}$ forward biases the second diode element CR2 and provides the second diode current $I_{CR2}$. Therefore, the first switching current $I_{SW1}$ is about zero and the second diode current $I_{CR2}$ is about equal to the first inductive current $I_{L1}$. The first switching current $I_{SW1}$ and the second diode current $I_{CR2}$ combine to provide the first inductive current $I_{L1}$.

FIGS. 9A and 9B are graphs showing timing relationships between boost switching power supply signals illustrated in FIG. 6. FIG. 9A is equivalent to FIG. 7A, which shows the boost switching signal $V_{BOOST}$, which has the boost switching period 32 having the boost off phase 36 and the boost on phase 34. FIG. 9B shows the first inductive current $I_{L1}$ in the first inductive element L1, which is about equal to the battery current $I_{BAT}$. As previously discussed, during the boost on phase 34, the voltage across the first inductive element L1 causes the first inductive current $I_{L1}$ to build in the first inductive element L1. The first inductive current $I_{L1}$ may build to a maximum first inductive current $I_{L1MAX}$. As previously discussed, during the boost off phase 36, since the output voltage $V_{OUT}$ is positive relative to the battery voltage $V_{BAT}$, the first inductive current $I_{L1}$ in the first inductive element L1 starts to drop. The first inductive current $I_{L1}$ may drop to a minimum first inductive current $I_{L1MIN}$. The difference between the maximum first inductive current $I_{L1MAX}$ and the minimum first inductive current $I_{L1MIN}$ may characterize a first inductive element L1 ripple current (not shown), which may be minimized if the first inductive element L1 is sufficiently large.

FIG. 10 shows a battery current limited buck switching power supply 38 according to one embodiment of the present invention. The battery current limited buck switching power supply 38 is similar to the buck switching power supply 10 illustrated in FIG. 1, except the battery current limited buck switching power supply 38 includes circuitry to limit an instantaneous battery current to less than or equal to an instantaneous battery current threshold, circuitry to limit an average battery current to less than or equal to an average battery current threshold, or both.

The battery current limited buck switching power supply 38 includes current sensed buck conversion circuitry 40, battery current limited control circuitry 42, and a first capacitive element C1. The battery 16 provides the battery voltage $V_{BAT}$ and the battery current $I_{BAT}$ to the current sensed buck conversion circuitry 40 and the battery current limited control circuitry 42. The current sensed buck conversion circuitry 40 uses the battery voltage $V_{BAT}$ and a portion of the battery current $I_{BAT}$ to provide the regulated output signal to a load (not shown). The battery current limited control circuitry 42 provides the buck switching signal $V_{BUCK}$ to the current sensed buck conversion circuitry 40. The regulated output signal includes the output voltage $V_{OUT}$ and the output current $I_{OUT}$, and is based on the battery voltage $V_{BAT}$, the battery current $I_{BAT}$, and the buck switching signal $V_{BUCK}$. The battery current limited control circuitry 42 receives the control signal $V_{CONT}$ and senses the regulated output signal, and regulates the regulated output signal by providing the appropriate buck switching signal $V_{BUCK}$ based on the control signal $V_{CONT}$ and the sensed regulated output signal.

In an exemplary embodiment of the present invention, the battery current limited control circuitry 42 regulates the output voltage $V_{OUT}$ by providing the appropriate buck switching signal $V_{BUCK}$ based on the control signal $V_{CONT}$ and a sensed output voltage $V_{OUT}$. The battery current limited buck switching power supply 38 is used to provide the output voltage $V_{OUT}$ that is less than the battery voltage $V_{BAT}$. The first capacitive element C1 is coupled between the current sensed buck conversion circuitry 40 and ground, and may be used to filter the regulated output signal to provide a constant output voltage $V_{OUT}$ that has minimal ripple. The battery 16 has the internal resistance R1, which may cause changes in the battery voltage $V_{BAT}$ under different loading conditions. The battery current limited control circuitry 42 may be powered from the battery 16. Typically, the portion of the battery current $I_{BAT}$ consumed by the battery current limited control circuitry 42 is small compared to the portion of the battery current $I_{BAT}$ received by the current sensed buck conversion circuitry 40.

The current sensed buck conversion circuitry 40 has a switching power supply current that is related to the battery current $I_{BAT}$. The current sensed buck conversion circuitry 40 uses the switching power supply current to create a buck current sense signal $V_{SNSBCKI}$, which is provided to the battery current limited control circuitry 42. The battery current limited control circuitry 42 estimates the instantaneous battery current, the average battery current, or both based on the buck current sense signal $V_{SNSBCKI}$, and provides the appropriate buck switching signal $V_{BUCK}$ to limit the instantaneous battery current, the average battery current, or both based on the estimated instantaneous battery current, the estimated average battery current, or both, respectively, as needed.

FIG. 11 shows details of the current sensed buck conversion circuitry 40 and the battery current limited control circuitry 42 illustrated in FIG. 10. The current sensed buck conversion circuitry 40 includes the first PMOS buck transistor element 18, the first diode element CR1, the first inductive element L1, a mirror PMOS buck transistor element 44, and buck current sensing circuitry 46. The source of the first PMOS buck transistor element 18 is coupled to the battery 16, the gate of the first PMOS buck transistor element 18 receives the buck switching signal $V_{BUCK}$ from the battery current limited control circuitry 42, and the drain of the first PMOS buck transistor element 18 is coupled to the cathode of the first diode element CR1, to the first terminal of the first inductive element L1, and to the buck current sensing circuitry 46. The source of the mirror PMOS buck transistor element 44 is coupled to the battery 16, the gate of the mirror PMOS buck transistor element 44 is coupled to ground, and the drain of the mirror PMOS buck transistor element 44 is coupled to the buck current sensing circuitry 46. The mirror PMOS buck transistor element 44 may replicate or mirror a portion of the current through the first PMOS buck transistor element 18.

The anode of the first diode element CR1 is coupled to ground, and the second terminal of the first inductive element L1 is coupled to the first terminal of the first capacitive element C1 to provide the regulated output signal. The second terminal of the first capacitive element C1 is coupled to ground. The first inductive element L1 has the first inductive current $I_{L1}$ and the first diode element CR1 has the first diode voltage $V_{CR1}$ at the cathode of the first diode element CR1. The buck current sensing circuitry 46 receives the buck switching signal $V_{BUCK}$ and provides the buck current sense signal $V_{SNSBCKI}$.

The battery current limited control circuitry 42 includes switching regulator circuitry 48 and battery current limiting circuitry 50, both of which may receive the battery voltage $V_{BAT}$ and may sense the regulated output signal. The battery current limiting circuitry 50 receives the buck current sense signal $V_{SNSBCKI}$, and estimates the instantaneous battery current, called an estimated instantaneous battery current $I_{BATINSTEST}$, the average battery current, called an estimated average battery current $I_{BATAVEEST}$, or both based on the buck current sense signal $V_{SNSBCKI}$. The battery current limiting circuitry 50 receives the control signal $V_{CONT}$ and provides a limiting control signal $V_{RAMP}$ to the switching regulator circuitry 48 based on the control signal $V_{CONT}$.

The switching regulator circuitry 48 receives the limiting control signal $V_{RAMP}$ and senses the regulated output signal, and regulates the regulated output signal by providing the appropriate buck switching signal $V_{BUCK}$ based on the limiting control signal $V_{RAMP}$ and the sensed regulated output signal. The battery current limiting circuitry 50 determines if battery current limiting is needed based on the control signal $V_{CONT}$, the estimated instantaneous battery current $I_{BATINSTEST}$, the estimated average battery current $I_{BATAVEEST}$, or any combination thereof. If battery current limiting is needed, the limiting control signal $V_{RAMP}$ is adjusted to provide appropriate current limiting. In an exemplary embodiment of the present invention, if battery current limiting is not needed, the limiting control signal $V_{RAMP}$ is equivalent to the control signal $V_{CONT}$.

Timing relationships between buck switching power supply signals of the battery current limited buck switching power supply 38 illustrated in FIGS. 10 and 11 may be similar to the timing relationships between buck switching power supply signals of the buck switching power supply 10 illustrated in FIGS. 3A, 3B, 3C, 3D, 4A, 4B, 4C, 4D, and 4E.

FIG. 12 shows details of the buck current sensing circuitry 46 illustrated in FIG. 11 according to a first embodiment of the buck current sensing circuitry 46. The buck current sensing circuitry 46 includes a buck operational amplifier 52, a first buck switch 54, a first NMOS buck transistor element 56, a mirror NMOS buck transistor element 58, a second resistive element R2, and a second capacitive element C2. Switching terminals of the first buck switch 54 are coupled between the drain of the first PMOS buck transistor element 18 (FIG. 11) and an inverting input of the buck operational amplifier 52. The second capacitive element C2 is coupled between the inverting input of the buck operational amplifier 52 and ground. An inverting control input of the first buck switch 54 receives the buck switching signal $V_{BUCK}$.

The drain of the mirror PMOS buck transistor element 44 is coupled to a non-inverting input of the buck operational amplifier 52 and to a drain of the first NMOS buck transistor element 56. Sources of the first and the mirror NMOS buck transistor elements 56, 58 are coupled to ground, and gates of the first and the mirror NMOS buck transistor elements 56, 58 are coupled to an output of the buck operational amplifier 52. The second resistive element R2 is coupled between the battery 16 (FIG. 11) and a drain of the mirror NMOS buck transistor element 58, which provides the buck current sense signal $V_{SNSBCKT}$. The drain of the mirror PMOS buck transistor element 44 has a buck mirror current $I_{BCKMIR}$.

Figure 13:
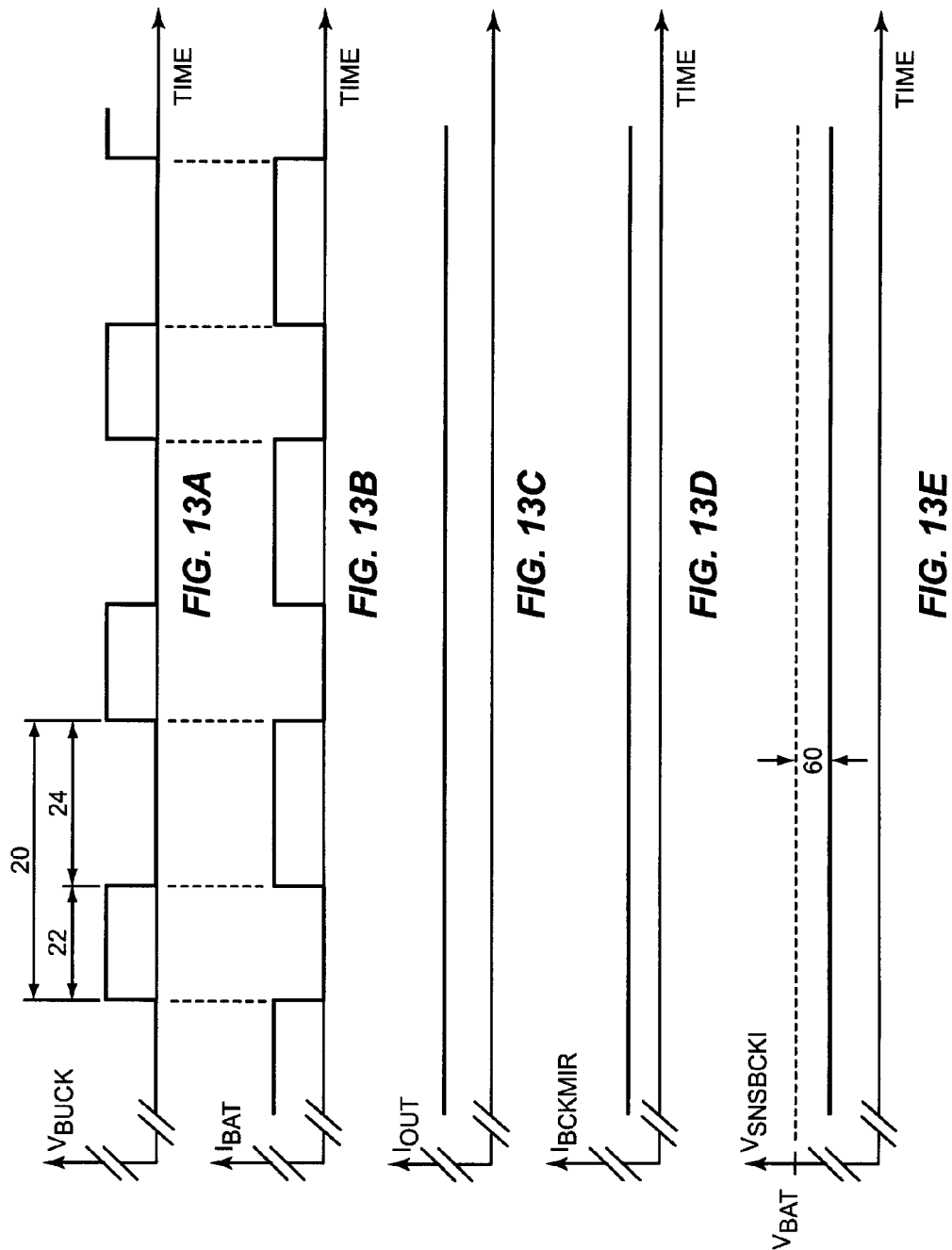

FIGS. 13A, 13B, 13C, 13D, and 13E are graphs showing timing relationships between buck switching power supply signals illustrated in FIGS. 11 and 12. FIG. 13A is equivalent to FIG. 3A, which shows the buck switching signal $V_{BUCK}$, which has the buck switching period 20 having the buck off phase 22 and the buck on phase 24. FIG. 13C shows the output current $I_{OUT}$ as being constant over time; therefore, the load (not shown) presents a constant current load to the battery current limited buck switching power supply 38. Loads in alternate embodiments of the present invention may be of varying currents; however, the described operating principals of the battery current limited buck switching power supply 38 are applicable.

The first buck switch 54 and the second capacitive element C2 function as a sample and hold circuit. During the buck on phase 24, the first buck switch 54 is in a CLOSED state, thereby providing the first diode voltage $V_{CR1}$ to the second capacitive element C2 and to the inverting input of the buck operational amplifier 52. During the buck off phase 22, the first buck switch 54 is in an OPEN state, such that the second capacitive element C2 holds the value of the first diode voltage $V_{CR1}$ from the buck on phase 24.

FIG. 13B shows the battery current $I_{BAT}$. As previously described, during the buck on phase 24, a portion of the battery current $I_{BAT}$ flows through the first PMOS buck transistor element 18 and the first inductive element L1 to provide the first inductive current $I_{L1}$, which is divided to provide the output current $I_{OUT}$. During the buck off phase 22 the first PMOS buck transistor element 18 is in the OFF state; therefore, the battery current $I_{BAT}$ drops to zero, or nearly zero.

During the buck on phase 24, the first diode voltage $V_{CR1}$ is the voltage at the drain of the first PMOS buck transistor element 18 in the ON state. This voltage is stored by the sample and hold circuit described above and presented continuously to the inverting input of the buck operational amplifier 52. The buck operational amplifier 52 and the first NMOS buck transistor element 56 form an amplifier circuit having an output provided by the drain of the first NMOS buck transistor element 56, which is coupled to the drain of the mirror PMOS buck transistor element 44. The amplifier circuit operates to maintain the voltage at the drain of the mirror PMOS buck transistor element 44 equal to the stored voltage in the sample and hold circuit. Therefore, the voltage at the drain of the mirror PMOS buck transistor element 44 is about equal to the voltage at the drain of the first PMOS buck transistor element 18 during the buck on phase 24. Since the gate of the mirror PMOS buck transistor element 44 is coupled to ground and the source of the mirror PMOS buck transistor element 44 is coupled to the battery 16, the mirror PMOS buck transistor element 44 is continuously in an ON state and has a drain current that mirrors the drain current of the first PMOS buck transistor element 18 during the buck on phase 24. Therefore, the buck mirror current $I_{BCKMIR}$ is representative of the drain current of the first PMOS buck transistor element 18 during the buck on phase 24, as illustrated in FIG. 13D.

Since the first PMOS buck transistor element 18 during the buck on phase 24 provides the first inductive current $I_{L1}$, which may change very little during the buck on phase 24, and since the first inductive current $I_{L1}$ may be about equal to the output current $I_{OUT}$, the buck mirror current $I_{BCKMIR}$ may be representative of an average output current $I_{OUTAVE}$. Since the first PMOS buck transistor element 18 during the buck on phase 24 may receive most of the battery current $I_{BAT}$, the current passing through the first PMOS buck transistor element 18 may be about equal to an instantaneous battery current $I_{BATINST}$. Therefore, since the buck mirror current $I_{BCKMIR}$ is representative of the current passing through the first PMOS buck transistor element 18, the buck mirror current $I_{BCKMIR}$ may be representative of the instantaneous battery current $I_{BATINST}$, representative of the average output current $I_{OUTAVE}$, or both. Additionally, a magnitude of the current passing through the first PMOS buck transistor element 18 during the buck on phase 24 may be about equal to an estimate of the instantaneous battery current $I_{BATINST}$.

Since the drain of the first NMOS buck transistor element 56 receives the buck mirror current $I_{BCKMIR}$, and since the gates of the first and the mirror NMOS buck transistor elements 56, 58 are coupled together, the mirror NMOS buck transistor element 58 may mirror the buck mirror current $I_{BCKMIR}$. This mirror current of the buck mirror current $I_{BCKMIR}$ flows through the second resistive element R2; therefore, a first voltage difference 60 across the second resistive element R2 may be representative of the buck mirror current $I_{BCKMIR}$. Since the second resistive element R2 is coupled to the battery 16, the first voltage difference 60 appears between the battery voltage $V_{BAT}$ and the buck current sense signal $V_{SNSBCKT}$, as illustrated in FIG. 13E. The first voltage difference 60 may be used by the battery current limited control circuitry 42 to estimate the average output current $I_{OUTAVE}$ to provide an estimated average output current $I_{OUTAVEEST}$, to estimate the instantaneous battery current $I_{BATINST}$ to provide the estimated instantaneous battery current $I_{BATINSTEST}$, or both.

To the extent that the first inductive current $I_{L1}$ is not equal to the output current $I_{OUT}$, the estimated average output current $I_{OUTAVEEST}$ may not be entirely accurate. Ripple currents in the first inductive element L1 and the first capacitive element C1, and sense current received by the battery current limited control circuitry 42 may contribute to errors in the estimated average output current $I_{OUTAVEEST}$. To the extent that the drain current of the first PMOS buck transistor element 18 during the buck on phase 24 is not equal to the battery current $I_{BAT}$, the estimated instantaneous battery current $I_{BATINSTEST}$ may not be entirely accurate. Current received by the battery current limited control circuitry 42 may contribute to error in the estimated instantaneous battery current $I_{BATINSTEST}$.

By power balancing the battery current limited buck switching power supply 38, the estimated average output current $I_{OUTAVEEST}$ may be used to estimate an average battery current $I_{BATAVE}$ to provide the estimated average battery current $I_{BATAVEEST}$. An estimated average output power $P_{OUTEST}$ from the battery current limited buck switching power supply 38 may be about equal to an efficiency K of the battery current limited buck switching power supply 38 times an estimated average power delivered from the battery 16, called an estimated average battery power $P_{BATEST}$, as illustrated in EQ. 1.

$$P_{OUTEST} = K * P_{BATEST}. \qquad \text{EQ. 1}$$

The estimated average battery power $P_{BATEST}$ may be equal to a product of the battery voltage $V_{BAT}$ and the estimated average battery current $I_{BATAVEEST}$. Similarly, the estimated average output power $P_{OUTEST}$ may be equal to a product of the output voltage $V_{OUT}$ and the estimated average output current $I_{OUTAVEEST}$, as illustrated by substitutions into EQ. 1 to provide EQ. 2.

$$V_{OUT} * I_{OUTAVEEST} = K * V_{BAT} * I_{BATAVEEST}. \qquad \text{EQ. 2}$$

EQ. 3 is based on solving EQ. 2 for $I_{BATAVEEST}$.

$$I_{BATAVEEST} = [V_{OUT} * I_{OUTAVEEST}]/[K*V_{BAT}]. \quad \text{EQ. 3}$$

The battery current limiting circuitry 50 may include circuitry to measure the output voltage $V_{OUT}$ and the battery voltage $V_{BAT}$. Additionally, the efficiency K of the battery current limited buck switching power supply 38 may be provided to the battery current limiting circuitry 50; therefore, the battery current limiting circuitry 50 may provide the estimated average battery current $I_{BATAVEEST}$ based on the estimated average output current $I_{OUTAVEEST}$.

In one embodiment of the present invention, the internal resistance R1 may be estimated to provide an estimated internal battery resistance. The estimated internal battery resistance may be based on an estimated no-load battery voltage, an estimated loaded battery voltage, and the estimated instantaneous battery current $I_{BATINSTEST}$ under battery loaded conditions. The estimated no-load battery voltage may be based on measuring the battery voltage $V_{BAT}$ under battery no-load conditions. The estimated loaded battery voltage may be based on measuring the battery voltage $V_{BAT}$ under battery loaded conditions.

An estimated battery voltage may be based on measuring the battery voltage $V_{BAT}$, measuring the battery voltage $V_{BAT}$ under battery loaded conditions, or measuring the battery voltage $V_{BAT}$ under battery no load conditions. An estimated output voltage may be based on measuring the output voltage $V_{OUT}$. The estimated average battery current $I_{BATAVEEST}$ may be based on the estimated average output current $I_{OUTAVEEST}$, the estimated battery voltage, the estimated output voltage, an estimated efficiency of the battery current limited buck switching power supply 38, or any combination thereof.

The efficiency K of the battery current limited buck switching power supply 38 may be affected by the control signal $V_{CONT}$, the limiting control signal $V_{RAMP}$, or both. Therefore, the estimated efficiency of the battery current limited buck switching power supply 38 may be based on the control signal $V_{CONT}$, the limiting control signal $V_{RAMP}$, or both.

An alternate approach to estimating the average battery current $I_{BATAVE}$ is based on using the estimated instantaneous battery current $I_{BATINSTEST}$ and a duty-cycle of the battery current limited buck switching power supply 38 instead of using the estimated average output current $I_{OUTAVEEST}$ to estimate the average battery current $I_{BATAVE}$. According to an alternate embodiment of the present invention, the battery current limited control circuitry 42 uses the estimated instantaneous battery current $I_{BATINSTEST}$ provided by the first voltage difference 60 associated with the buck current sense signal $V_{SNSBCKI}$, as illustrated in FIG. 12 and FIG. 13E to provide the estimated average battery current $I_{BATAVEEST}$. The duty-cycle of the battery current limited buck switching power supply 38 may be based on a magnitude of the buck on phase 24 divided by a magnitude of the buck switching period 20. Since the battery current limited control circuitry 42 provides the buck switching signal $V_{BUCK}$, the battery current limited control circuitry 42 may determine the duty-cycle of the battery current limited buck switching power supply 38. The estimated average battery current $I_{BATAVEEST}$ may be obtained by multiplying the estimated instantaneous battery current $I_{BATINSTEST}$ times the duty-cycle of the battery current limited buck switching power supply 38.

FIG. 14 shows details of the buck current sensing circuitry 46 illustrated in FIG. 11 according to a second embodiment of the buck current sensing circuitry 46. The buck current sensing circuitry 46 illustrated in FIG. 14 is similar to the buck current sensing circuitry 46 illustrated in FIG. 12, except the buck current sensing circuitry 46 illustrated in FIG. 14 includes a third resistive element R3, a second buck switch 62, and a lowpass filter 64. Whereas the first voltage difference 60 was associated with the buck current sense signal $V_{SNSBCKI}$ in the buck current sensing circuitry 46 illustrated in FIG. 12, the first voltage difference 60 is associated with a buck mirror voltage $V_{BCKMIR}$ in the buck current sensing circuitry 46 illustrated in FIG. 14.

A first switching terminal of the second buck switch 62 is coupled to the drain of the mirror NMOS buck transistor element 58. A second switching terminal of the second buck switch 62 provides a gated buck mirror voltage $V_{GBCKM}$ to the lowpass filter 64. The third resistive element R3 is coupled between the second switching terminal of the second buck switch 62 and the battery 16 (FIG. 11). An inverting control input of the second buck switch 62 receives the buck switching signal $V_{BUCK}$. The lowpass filter 64 provides the buck current sense signal $V_{SNSBCKI}$.

Figure 15:
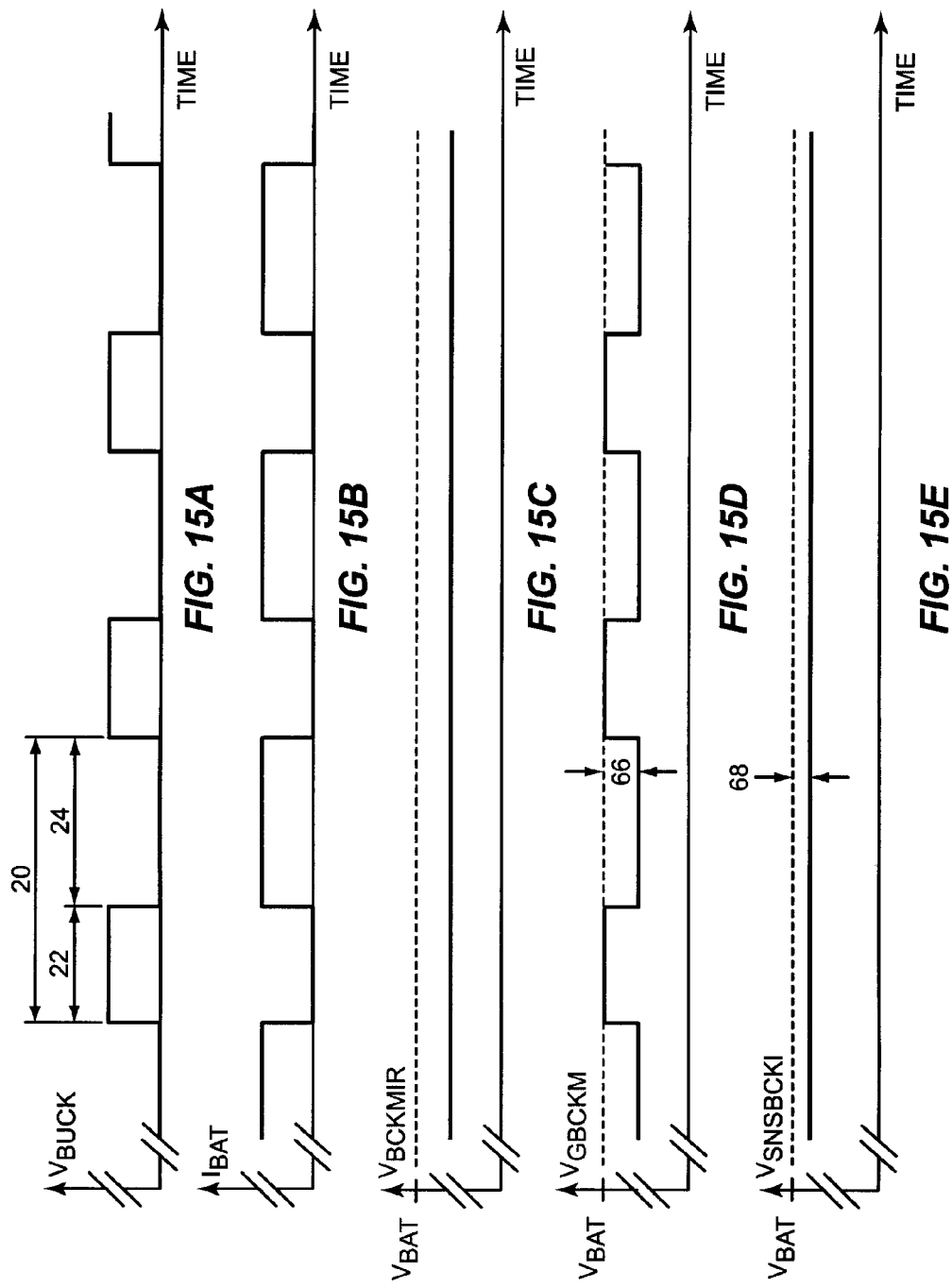

FIGS. 15A, 15B, 15C, 15D, and 15E are graphs showing timing relationships between buck switching power supply signals illustrated in FIGS. 11 and 14. FIG. 15A is equivalent to FIG. 3A, which shows the buck switching signal $V_{BUCK}$, which has the buck switching period 20 having the buck off phase 22 and the buck on phase 24. FIG. 15B shows the battery current $I_{BAT}$. As previously described, during the buck on phase 24, a portion of the battery current $I_{BAT}$ flows through the first PMOS buck transistor element 18 and the first inductive element L1 to provide the first inductive current $I_{L1}$. During the buck off phase 22, the first PMOS buck transistor element 18 is in the OFF state; therefore, the battery current $I_{BAT}$ drops to zero, or nearly zero. FIG. 15C shows the buck mirror voltage $V_{BCKMIR}$, such that the first voltage difference 60 is the difference between the battery voltage $V_{BAT}$ and the buck mirror voltage $V_{BCKMIR}$. Therefore, the first voltage difference 60 may be representative of the current through the first PMOS buck transistor element 18 during the buck on phase 24, which may be representative of the battery current $I_{BAT}$ during the buck on phase 24.

During the buck on phase 24, the second buck switch 62 is in a CLOSED state, thereby providing the buck mirror voltage $V_{BCKMIR}$ to the lowpass filter 64, such that the gated buck mirror voltage $V_{GBCKM}$ is about equal to the buck mirror voltage $V_{BCKMIR}$. During the buck off phase 22, the second buck switch 62 is in an OPEN state, such that the third resistive element R3 pulls the gated buck mirror voltage $V_{GBCKM}$ up to the battery voltage $V_{BAT}$, as illustrated in FIG. 15D. During the buck on phase 24, a second voltage difference 66 is the difference between the battery voltage $V_{BAT}$ and the gated buck mirror voltage $V_{GBCKM}$. The gated buck mirror voltage $V_{GBCKM}$ may be a time-accurate representation of the battery current $I_{BAT}$ with a magnitude of the battery voltage $V_{BAT}$ as a zero battery current reference and the second voltage difference 66 increasing as the battery current $I_{BAT}$ increases. For example, with a battery current $I_{BAT}$ equal to about zero, the second voltage difference 66 is about zero and the gated buck mirror voltage $V_{GBCKM}$ as illustrated in FIG. 15D would essentially be a straight line having a magnitude of the battery voltage $V_{BAT}$.

The lowpass filter 64 filters the gated buck mirror voltage $V_{GBCKM}$ to provide the buck current sense signal $V_{SNSBCKI}$ with a magnitude of the battery voltage $V_{BAT}$ as a zero battery current reference, as illustrated in FIG. 15E. Filtering the gated buck mirror voltage $V_{GBCKM}$ effectively averages the gated buck mirror voltage $V_{GBCKM}$; therefore, since the gated buck mirror voltage $V_{GBCKM}$ may be a time-accurate representation of the battery current $I_{BAT}$, the buck current sense signal $V_{SNSBCKI}$ may be a representation of the average battery current $I_{BATAVE}$. Specifically, the estimated average battery current $I_{BATAVEEST}$ may be based on a third voltage difference 68 between the battery voltage $V_{BAT}$ and the buck current sense signal $V_{SNSBCKI}$.

FIG. 16 shows a battery current limited boost switching power supply 70 according to an alternate embodiment of the present invention. The battery current limited boost switching power supply 70 is similar to the boost switching power supply 26 illustrated in FIG. 5, except the battery current limited boost switching power supply 70 includes circuitry to limit an instantaneous battery current to less than or equal to an instantaneous battery current threshold, circuitry to limit an average battery current to less than or equal to an average battery current threshold, or both.

The battery current limited boost switching power supply 70 includes current sensed boost conversion circuitry 72, the battery current limited control circuitry 42, and the first capacitive element C1. The battery 16 provides the battery voltage $V_{BAT}$ and the battery current $I_{BAT}$ to the current sensed boost conversion circuitry 72 and the battery current limited control circuitry 42. The current sensed boost conversion circuitry 72 uses the battery voltage $V_{BAT}$ and a portion of the battery current $I_{BAT}$ to provide the regulated output signal to a load (not shown). The battery current limited control circuitry 42 provides the boost switching signal $V_{BOOST}$ to the current sensed boost conversion circuitry 72. The regulated output signal includes the output voltage $V_{OUT}$ and the output current $I_{OUT}$, and is based on the battery voltage $V_{BAT}$, the battery current $I_{BAT}$, and the boost switching signal $V_{BOOST}$. The battery current limited control circuitry 42 receives the control signal $V_{CONT}$ and senses the regulated output signal, and regulates the regulated output signal by providing the appropriate boost switching signal $V_{BOOST}$ based on the control signal $V_{CONT}$ and the sensed regulated output signal.

In an exemplary embodiment of the present invention, the battery current limited control circuitry 42 regulates the output voltage $V_{OUT}$ by providing the appropriate boost switching signal $V_{BOOST}$ based on the control signal $V_{CONT}$ and a sensed output voltage $V_{OUT}$. The battery current limited boost switching power supply 70 is used to provide the output voltage $V_{OUT}$ that is greater than the battery voltage $V_{BAT}$. The first capacitive element C1 is coupled between the current sensed boost conversion circuitry 72 and ground, and may be used to filter the regulated output signal to provide a constant output voltage $V_{OUT}$ that has minimal ripple. The battery 16 has the internal resistance R1, which may cause changes in the battery voltage $V_{BAT}$ under different loading conditions. The battery current limited control circuitry 42 may be powered from the battery 16. Typically, the portion of the battery current $I_{BAT}$ consumed by the battery current limited control circuitry 42 is small compared to the portion of the battery current $I_{BAT}$ received by the current sensed boost conversion circuitry 72.

The current sensed boost conversion circuitry 72 has a switching power supply current that is related to the battery current $I_{BAT}$. The current sensed boost conversion circuitry 72 uses the switching power supply current to create a boost current sense signal $V_{SNSBSTI}$, which is provided to the battery current limited control circuitry 42. The battery current limited control circuitry 42 estimates the instantaneous battery current, the average battery current, or both based on the boost current sense signal $V_{SNSBSTI}$, and provides the appropriate boost switching signal $V_{BOOST}$ to limit the instantaneous battery current, the average battery current, or both based on the estimated instantaneous battery current, the estimated average battery current, or both, respectively, as needed.

FIG. 17 shows details of the current sensed boost conversion circuitry 72 and the battery current limited control circuitry 42 illustrated in FIG. 16. The current sensed boost conversion circuitry 72 includes the first NMOS boost transistor element 30, the second diode element CR2, the first inductive element L1, a mirror NMOS boost transistor element 74, and boost current sensing circuitry 76. The drain of the first NMOS boost transistor element 30 is coupled to the first terminal of the first inductive element L1, to the anode of the second diode element CR2, and to the boost current sensing circuitry 76. A gate of the first NMOS boost transistor element 30 and the boost current sensing circuitry 76 receive the boost switching signal $V_{BOOST}$ from the battery current limited control circuitry 42, and the sources of the first and the mirror NMOS boost transistor elements 30, 74 are coupled to ground. A second terminal of the first inductive element L1, a gate of the mirror NMOS boost transistor element 74, and the boost current sensing circuitry 76 are coupled to the battery 16. A cathode of the second diode element CR2 is coupled to the first terminal of the first capacitive element C1 to provide the regulated output signal. The second terminal of the first capacitive element C1 is coupled to ground. The boost current sensing circuitry 76 receives the boost switching signal $V_{BOOST}$ and provides the boost current sense signal $V_{SNSBSTI}$. A drain of the mirror NMOS boost transistor element 74 is coupled to the boost current sensing circuitry 76. The first inductive element L1 has the first inductive current $I_{L1}$, the second diode element CR2 has the second diode current $I_{CR2}$ and the second diode voltage $V_{CR2}$ at the anode of the second diode element CR2, and the first NMOS boost transistor element 30 has the first switching current $I_{SW1}$. The mirror NMOS boost transistor element 74 may replicate or mirror a portion of the current through the first NMOS boost transistor element 30.

The battery current limited control circuitry 42 includes the switching regulator circuitry 48 and the battery current limiting circuitry 50, both of which may receive the battery voltage $V_{BAT}$ and may sense the regulated output signal. The battery current limiting circuitry 50 receives the boost current sense signal $V_{SNSBSTI}$, and estimates the instantaneous battery current, called the estimated instantaneous battery current $I_{BATINSTEST}$, the average battery current, called the estimated average battery current $I_{BATAVEEST}$, or both based on the boost current sense signal $V_{SNSBSTI}$. The battery current limiting circuitry 50 receives the control signal $V_{CONT}$ and provides the limiting control signal $V_{RAMP}$ to the switching regulator circuitry 48 based on the control signal $V_{CONT}$.

The switching regulator circuitry 48 receives the limiting control signal $V_{RAMP}$ and senses the regulated output signal, and regulates the regulated output signal by providing the appropriate boost switching signal $V_{BOOST}$ based on the limiting control signal $V_{RAMP}$ and the sensed regulated output signal. The battery current limiting circuitry 50 determines if battery current limiting is needed based on the control signal $V_{CONT}$, the estimated instantaneous battery current $I_{BATINSTEST}$, the estimated average battery current $I_{BATAVEEST}$, or any combination thereof. If battery current limiting is needed, the limiting control signal $V_{RAMP}$ is adjusted to provide appropriate current limiting. In an exemplary embodiment of the present invention, if battery current limiting is not needed, the limiting control signal $V_{RAMP}$ is equivalent to the control signal $V_{CONT}$.

Timing relationships between boost switching power supply signals of the battery current limited boost switching power supply 70 illustrated in FIGS. 16 and 17 may be similar to the timing relationships between boost switching power supply signals of the boost switching power supply 26 illustrated in FIGS. 7A, 7B, 7C, 8A, 8B, 8C, 8D, 8E, 9A, and 9B.

FIG. 18 shows details of the boost current sensing circuitry 76 illustrated in FIG. 17 according to one embodiment of the boost current sensing circuitry 76. The boost current sensing circuitry 76 includes a first boost switch 78, a boost operational amplifier 80, a first PMOS boost transistor element 82, a mirror PMOS boost transistor element 84, a fourth resistive element R4, and a third capacitive element C3. Switching terminals of the first boost switch 78 are coupled between the drain of the first NMOS boost transistor element 30 (FIG. 17) and an inverting input of the boost operational amplifier 80. The third capacitive element C3 is coupled between the inverting input of the boost operational amplifier 80 and ground. A non-inverting control input of the first boost switch 78 receives the boost switching signal $V_{BOOST}$.

The drain of the mirror NMOS boost transistor element 74 is coupled to a non-inverting input of the boost operational amplifier 80 and to a drain of the first PMOS boost transistor element 82. Sources of the first and the mirror PMOS boost transistor elements 82, 84 are coupled to the battery 16 (FIG. 17), and gates of the first and the mirror PMOS boost transistor elements 82, 84 are coupled to an output of the boost operational amplifier 80. The fourth resistive element R4 is coupled between ground and a drain of the mirror PMOS boost transistor element 84, which provides the boost current sense signal $V_{SNSBSTI}$. The drain of the mirror NMOS boost transistor element 74 has a boost mirror current $I_{BSTMIR}$.

Figure 19:
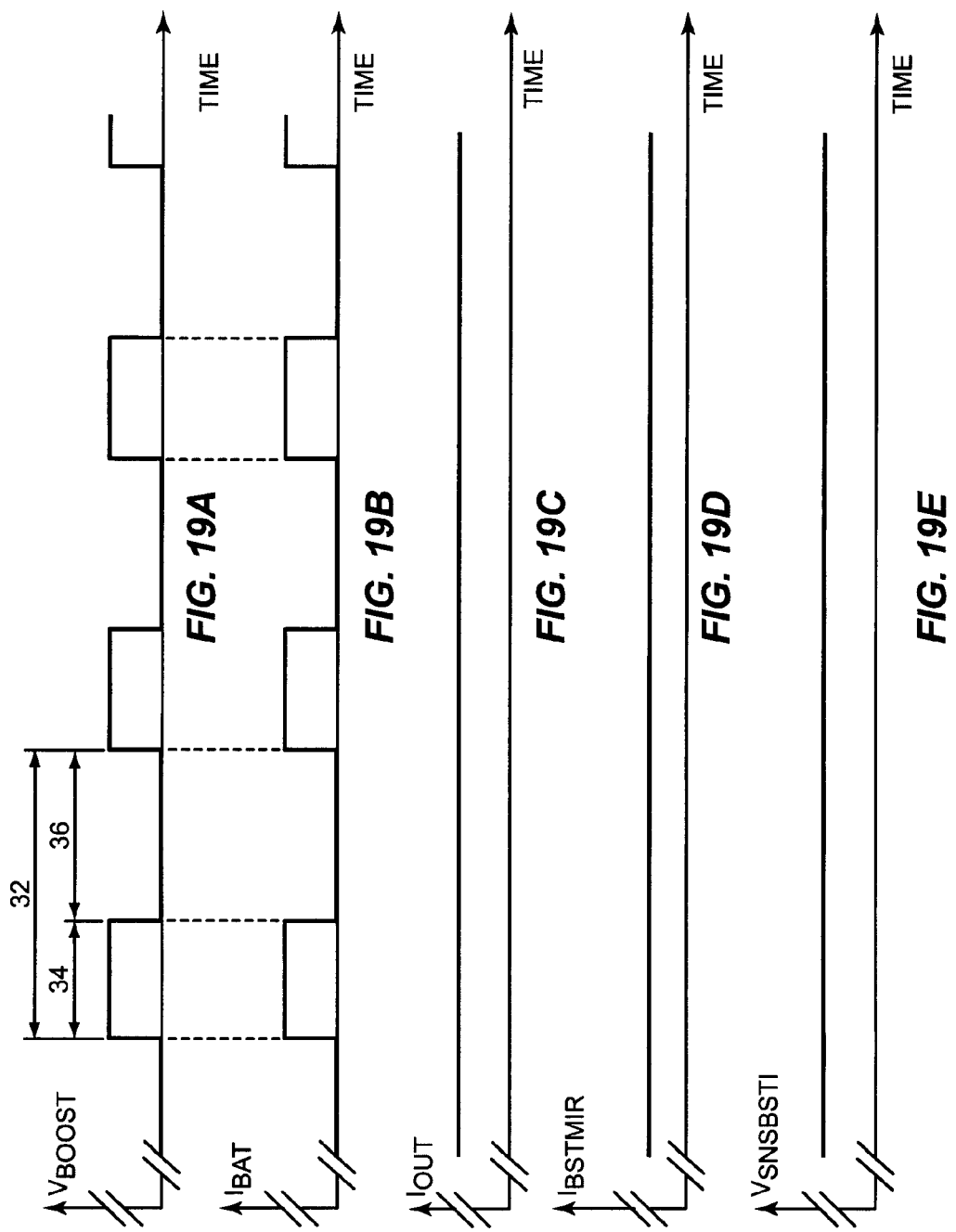

FIGS. 19A, 19B, 19C, 19D, and 19E are graphs showing timing relationships between boost switching power supply signals illustrated in FIGS. 17 and 18. FIG. 19A is equivalent to FIG. 7A, which shows the boost switching signal $V_{BOOST}$, which has the boost switching period 32 having the boost off phase 36 and the boost on phase 34. FIG. 19C shows the output current $I_{OUT}$ as being constant over time; therefore, the load (not shown) presents a constant current load to the battery current limited boost switching power supply 70. Other loads may be of varying currents; however, the described operating principals of the boost switching power supply 26 are applicable.

FIG. 19B shows the battery current $I_{BAT}$. As previously described, during the boost on phase 34 and during the boost off phase 36, a portion of the battery current $I_{BAT}$ flows through the first inductive element L1 to provide the first inductive current $I_{L1}$; therefore, since the first inductive current $I_{L1}$ may be relatively constant, the battery current $I_{BAT}$ may be relatively constant. However, during the boost off phase 36, since the first inductive current $I_{L1}$ provides the second diode current $I_{CR2}$, which is divided to provide the output current $I_{OUT}$ and current to restore any charge depleted from the first capacitive element C1 during the boost on phase 34, the battery current $I_{BAT}$ is greater than the output current $I_{OUT}$.

The first boost switch 78 and the third capacitive element C3 function as a sample and hold circuit. During the boost on phase 34, the first boost switch 78 is in a CLOSED state, thereby providing the second diode voltage $V_{CR2}$ to the third capacitive element C3 and to the inverting input of the boost operational amplifier 80. During the boost off phase 36, the first boost switch 78 is in an OPEN state, such that the third capacitive element C3 holds the value of the second diode voltage $V_{CR2}$ from the boost on phase 34.

During the boost on phase 34, the second diode voltage $V_{CR2}$ is the voltage at the drain of the first PMOS buck transistor element 18 in the ON state. This voltage is stored by the sample and hold circuit described above and presented continuously to the inverting input of the boost operational amplifier 80. The boost operational amplifier 80 and the first PMOS boost transistor element 82 form an amplifier circuit having an output provided by the drain of the first PMOS boost transistor element 82, which is coupled to the drain of the mirror NMOS boost transistor element 74. The amplifier circuit operates to maintain the voltage at the drain of the mirror NMOS boost transistor element 74 equal to the stored voltage in the sample and hold circuit. Therefore, the voltage at the drain of the mirror NMOS boost transistor element 74 is about equal to the voltage at the drain of the voltage at the first NMOS boost transistor element 30 during the boost on phase 34. Since the gate of the mirror NMOS boost transistor element 74 is coupled to the battery 16 and the source of the mirror NMOS boost transistor element 74 is coupled to ground, the mirror NMOS boost transistor element 74 is continuously in an ON state and has a drain current that mirrors the drain current of the first NMOS boost transistor element 30 during the boost on phase 34. Therefore, the boost mirror current $I_{BSTMIR}$ is representative of the drain current of the first NMOS boost transistor element 30 during the boost on phase 34, as illustrated in FIG. 19D.

Since the first NMOS boost transistor element 30 during the boost on phase 34 receives the first inductive current $I_{L1}$, which may change very little during the boost on phase 34, and since the first inductive current $I_{L1}$ may be about equal to the battery current $I_{BAT}$, the boost mirror current $I_{BSTMIR}$ may be representative of the instantaneous battery current $I_{BATINST}$. Since both the battery current $I_{BAT}$ and the boost mirror current $I_{BSTMIR}$ may be relatively constant, the boost mirror current $I_{BSTMIR}$ may be representative of the average battery current $I_{BATAVE}$. Therefore, the current passing through the first NMOS boost transistor element 30 during the boost on phase 34 may be about equal to both the average battery current $I_{BATAVE}$ and the instantaneous battery current $I_{BATINST}$, and the magnitude of the current passing through the first NMOS boost transistor element 30 during the boost on phase 34 may be about equal to both an estimate of the average battery current $I_{BATAVE}$ and an estimate of the instantaneous battery current $I_{BATINST}$.

Since the drain of the first PMOS boost transistor element 82 receives the boost mirror current $I_{BSTMIR}$, and since the gates of the first and the mirror PMOS boost transistor elements 82, 84 are coupled together, the mirror PMOS boost transistor element 84 may mirror the boost mirror current $I_{BSTMIR}$. This mirror current of the boost mirror current $I_{BSTMIR}$ flows through the fourth resistive element R4; therefore, a voltage across the fourth resistive element R4 may be representative of the boost mirror current $I_{BSTMIR}$. Since the boost current sense signal $V_{SNSBSTI}$ is provided by the fourth resistive element R4 and the mirror PMOS boost transistor element 84, the boost current sense signal $V_{SNSBSTI}$ may be representative of the boost mirror current $I_{BSTMIR}$, as illustrated in FIG. 19E.

The boost current sense signal $V_{SNSBSTI}$ may be used by the battery current limited control circuitry 42 to estimate the instantaneous battery current $I_{BATINST}$ to provide the estimated instantaneous battery current $I_{BATINSTEST}$, to estimate the average battery current $I_{BATAVE}$ to provide the estimated average battery current $I_{BATAVEEST}$, or both. To the extent that the first inductive current $I_{L1}$ is not equal to the battery current $I_{BAT}$, the estimated instantaneous battery current $I_{BATINSTEST}$, the estimated average battery current $I_{BATAVEEST}$, or both may not be entirely accurate. Ripple currents in the first inductive element L1 and the first capacitive element C1, and sense current received by the battery current limited control circuitry 42 may contribute to errors in the estimated instantaneous battery current $I_{BATINSTEST}$, the estimated average battery current $I_{BATAVEEST}$, or both.

FIG. 20 shows a battery current limited buck and boost switching power supply 86 according to an additional embodiment of the present invention. The battery current limited buck and boost switching power supply 86 may provide the output voltage $V_{OUT}$ greater than, equal to, or less than the battery voltage $V_{BAT}$. The current sensed buck conversion circuitry 40 and the current sensed boost conversion circuitry 72 may be combined to form current sensed buck and boost conversion circuitry 88 to support either a boost operating mode or a buck operating mode, as needed, depending on the output voltage $V_{OUT}$ being less than, equal to, or greater than the battery voltage $V_{BAT}$. The current sensed buck conversion circuitry 40 and the current sensed boost conversion circuitry 72 may share a common first inductive element L1.

FIG. 21 shows details of the current sensed buck and boost conversion circuitry 88 according to a supplemental embodiment of the present invention. The current sensed buck and boost conversion circuitry 88 includes the first PMOS buck transistor element 18 coupled to the battery 16 (FIG. 20), the first NMOS boost transistor element 30, the first inductive element L1 coupled between the first PMOS buck transistor element 18 and the first NMOS boost transistor element 30, the mirror PMOS buck transistor element 44, the first diode element CR1, the buck current sensing circuitry 46, the second diode element CR2, the mirror NMOS boost transistor element 74, and the boost current sensing circuitry 76.

The battery current limited control circuitry 42 (FIG. 20) provides both the buck switching signal $V_{BUCK}$ and the boost switching signal $V_{BOOST}$ to the current sensed buck and boost conversion circuitry 88. The buck switching signal $V_{BUCK}$ is active during the buck operating mode and the boost switching signal $V_{BOOST}$ is active during the boost operating mode. During the buck operating mode, the current sensed buck and boost conversion circuitry 88 functions similarly to the current sensed buck conversion circuitry 40, as previously described, and during the boost operating mode, the current sensed buck and boost conversion circuitry 88 functions similarly to the current sensed boost conversion circuitry 72, as previously described.

In another embodiment of the present invention, any or all of the battery current limited buck and boost switching power supply 86, the battery current limited buck switching power supply 38, and the battery current limited boost switching power supply 70 may include supplemental circuitry 90 (FIG. 20) coupled to the battery 16. The supplemental circuitry 90 may receive a portion of the battery current $I_{BAT}$. To help enable accurate estimates of battery current $I_{BAT}$, the supplemental circuitry 90 may provide a supplemental current sense signal $V_{SNSSUPI}$ to the battery current limited control circuitry 42. The supplemental current sense signal $V_{SNSSUPI}$ may be representative of the portion of the battery current $I_{BAT}$ received by the supplemental circuitry 90. An estimated supplemental current may be based on the supplemental current sense signal $V_{SNSSUPI}$. The estimated instantaneous battery current $I_{BATINSTEST}$, the estimated average battery current $I_{BATAVEEST}$, or both may be further based on the estimated supplemental current. Specifically, the estimated supplemental current may be added to current estimates based on a switching power supply current to provide the estimated instantaneous battery current $I_{BATINSTEST}$, the estimated average battery current $I_{BATAVEEST}$, or both. Alternatively, the supplemental circuitry 90 may be external to any or all of the battery current limited buck and boost switching power supply 86, the battery current limited buck switching power supply 38, and the battery current limited boost switching power supply 70.

FIG. 22 shows details of the battery current limiting circuitry 50 illustrated in FIG. 11 according to one embodiment of the present invention. The battery current limiting circuitry 50 may include average battery current projection and limiting circuitry 92 and average battery current estimating circuitry 94. The average battery current estimating circuitry 94 may receive any information needed to properly estimate battery currents, such as the battery voltage $V_{BAT}$, the output voltage $V_{OUT}$, or the buck current sense signal $V_{SNSBCKI}$. The average battery current estimating circuitry 94 provides an average battery current signal $V_{ABATI}$ to the average battery current projection and limiting circuitry 92. The average battery current signal $V_{ABATI}$ may be based on the estimated average battery current $I_{BATAVEEST}$. The average battery current projection and limiting circuitry 92 receives the control signal $V_{CONT}$ and provides the limiting control signal $V_{RAMP}$, which is based on the control signal $V_{CONT}$ and the average battery current signal $V_{ABATI}$. The average battery current projection and limiting circuitry 92 operates to prevent the battery current $I_{BAT}$ from exceeding acceptable battery current limits by controlling the limiting control signal $V_{RAMP}$. The acceptable battery current limits may include an average battery current limit $I_{BATAVELIM}$, an instantaneous battery current limit $I_{BATINSTLIM}$, or both.

An alternate embodiment of the present invention relates to the embodiment of the buck current sensing circuitry 46 illustrated in FIGS. 12, 13A, 13B, 13C, 13D, and 13E, in which the battery current $I_{BAT}$ is prevented from exceeding acceptable battery current limits by establishing corresponding acceptable output current limits and preventing estimated output currents from exceeding the acceptable output current limits, which may include an average output current limit $I_{OUTAVELIM}$, an instantaneous output current limit $I_{OUTINSTLIM}$, or both. The relationship between the estimated average output current $I_{OUTAVEEST}$ and the estimated average battery current $I_{BATAVEEST}$ was previously presented in EQ. 2 and is replicated in EQ. 4 below.

$$V_{OUT} * I_{OUTAVEEST} = K * V_{BAT} * I_{BATAVEEST}. \quad \text{EQ. 4}$$

EQ. 5 is obtained by substituting current limits for current estimates.

$$V_{OUT} * I_{OUTAVELIM} = K * V_{BAT} * I_{BATAVELIM}. \quad \text{EQ. 5}$$

The battery voltage $V_{BAT}$ in EQ. 5 is the voltage of the battery 16 (FIG. 11) when the battery 16 is providing the battery current $I_{BAT}$ equal to the average battery current limit $I_{BATAVELIM}$. Therefore, the battery voltage $V_{BAT}$ in EQ. 5 may not be known directly; however, the battery voltage $V_{BAT}$ in EQ. 5 may be approximated from the non-loaded battery voltage $V_{BATNL}$ illustrated in FIG. 3D and the internal resistance R1 of the battery 16, as shown in EQ. 6 below.

$$V_{BAT} = V_{BATNL} - [R1 * I_{BATAVELIM}]. \quad \text{EQ. 6}$$

The internal resistance R1 may be approximated from the non-loaded battery voltage $V_{BATNL}$ and the loaded battery voltage $V_{BATLD}$ illustrated in FIG. 3D, and from the battery current $I_{BAT}$ that corresponds with the loaded battery voltage $V_{BATLD}$, as shown in EQ. 7 below.

$$R1 = [V_{BATNL} - V_{BATLD}] / I_{BAT}. \quad \text{EQ. 7}$$

The relationship between the estimated average output current $I_{OUTAVEEST}$ and the estimated average battery current $I_{BATAVEEST}$ is shown in EQ. 8, which is obtained by substituting EQ. 6 into EQ. 5 and re-arranging, as shown below.

$$I_{OUTAVELIM} = K[(V_{BATNL} * I_{BATAVELIM}) - (R1 * I_{BATAVELIM}^2)]/V_{OUT}. \quad \text{EQ. 8}$$

As previously discussed, the estimated instantaneous output current $I_{OUTINSTEST}$ is about equal to the estimated instantaneous battery current $I_{BATINSTEST}$ during the buck on phase 24 (FIG. 13A). Therefore, the instantaneous output current limit $I_{OUTINSTLIM}$ is about equal to the instantaneous battery current limit $I_{BATINSTLIM}$ during the buck on phase 24.

The average battery current projection and limiting circuitry 92 may use an instantaneous value of the control signal $V_{CONT}$, a projection of the control signal $V_{CONT}$, a projection of the control signal $V_{CONT}$ using the instantaneous battery current limit $I_{BATINSTLIM}$, a projection of the control signal $V_{CONT}$ using the average battery current limit $I_{BATAVELIM}$, a projection of the control signal $V_{CONT}$ using the instantaneous output current limit $I_{OUTINSTLIM}$, a projection of the control signal $V_{CONT}$ using the average output current limit $I_{OUTAVELIM}$, the estimated average battery current $I_{BATAVEEST}$, the estimated average output current $I_{OUTAVEEST}$, the estimated instantaneous battery current $I_{BATINSTEST}$, the estimated instantaneous output current $I_{OUTINSTEST}$, or any combination thereof, to prevent the battery current $I_{BAT}$ from exceeding acceptable battery current limits.

FIG. 23 is a graph showing timing relationships between buck switching power supply signals illustrated in FIG. 22 according to an example of the battery current limited buck switching power supply 38. The control signal $V_{CONT}$ is provided to the average battery current projection and limiting circuitry 92 and represents a desired output response from the battery current limited buck switching power supply 38. If no battery current limiting is necessary, the average battery current projection and limiting circuitry 92 passes the control signal $V_{CONT}$ along to the limiting control signal $V_{RAMP}$ without modification. However, in this example, current limiting is needed; therefore, the limiting control signal $V_{RAMP}$ is different from the control signal $V_{CONT}$. A maximum average battery current response curve 96 is a projection that represents the shape of the control signal $V_{CONT}$ that corresponds with maximum average battery current. The control signal $V_{CONT}$ and the limiting control signal $V_{RAMP}$ begin with a magnitude less than the maximum average battery current response curve 96; however, the control signal $V_{CONT}$ increases to equal the maximum average battery current response curve 96. At that point, the average battery current projection and limiting circuitry 92 may generate a first projection 98 of the limiting control signal $V_{RAMP}$ and apply a first correction 100 to the limiting control signal $V_{RAMP}$. Up to this point, the limiting control signal $V_{RAMP}$ tracked the control signal $V_{CONT}$; however, the first correction 100 drops the limiting control signal $V_{RAMP}$ below the maximum average battery current response curve 96. The limiting control signal $V_{RAMP}$ then resumes by following the shape of the control signal $V_{CONT}$ until the limiting control signal $V_{RAMP}$ increases to equal the maximum average battery current response curve 96. Therefore, a second projection 102 and a second correction 104 are applied to the limiting control signal $V_{RAMP}$. Since the limiting control signal $V_{RAMP}$ then remains below the maximum average battery current response curve 96, no further corrections are applied. The projections 98, 102 are based on average battery currents. In other embodiments of the present invention, projections may be based on average output currents, which have a correlation to average battery currents.

Alternate embodiments of the present invention may use different architectures from the ones presented in the battery current limited buck switching power supply 38, the battery current limited boost switching power supply 70, and the battery current limited buck and boost switching power supply 86. Alternate or additional energy storage devices may be used in place of or with the first inductive element L1. Alternate or additional energy filtering devices may be used in place of or with the first capacitive element C1. Alternate current detection methods may be used to detect current in the first NMOS boost transistor element 30, the first PMOS buck transistor element 18, or both. Any of these alternate embodiments are within the scope of the present invention.

An application example of a battery current limited buck and boost switching power supply 86 is its use in a mobile terminal 106, the basic architecture of which is represented in FIG. 24, according to an exemplary embodiment of the present invention. The mobile terminal 106 may include a receiver front end 108, a radio frequency transmitter section 110, an antenna 112, a duplexer or switch 114, a baseband processor 116, a control system 118, a frequency synthesizer 120, and an interface 122. The receiver front end 108 receives information bearing radio frequency signals from one or more remote transmitters provided by a base station (not shown). A low noise amplifier (LNA) 124 amplifies the signal. A filter circuit 126 minimizes broadband interference in the received signal, while down conversion and digitization circuitry 128 down converts the filtered, received signal to an intermediate or baseband frequency signal, which is then digitized into one or more digital streams. The receiver front end 108 typically uses one or more mixing frequencies generated by the frequency synthesizer 120. The baseband processor 116 processes the digitized received signal to extract the information or data bits conveyed in the received signal. This processing typically comprises demodulation, decoding, and error correction operations. As such, the baseband processor 116 is generally implemented in one or more digital signal processors (DSPs).

On the transmit side, the baseband processor 116 receives digitized data, which may represent voice, data, or control information, from the control system 118, which it encodes for transmission. The encoded data is output to the transmitter 110, where it is used by a modulator 130 to modulate a carrier signal that is at a desired transmit frequency. Power amplifier circuitry 132 amplifies the modulated carrier signal to a level appropriate for transmission, and delivers the amplified and modulated carrier signal to the antenna 112 through the duplexer or switch 114. The battery current limited buck and boost switching power supply 86 provides power to the power amplifier circuitry 132 based on a control signal from the control system 118.

A user may interact with the mobile terminal 106 via the interface 122, which may include interface circuitry 134 associated with a microphone 136, a speaker 138, a keypad 140, and a display 142. The interface circuitry 134 typically includes analog-to-digital converters, digital-to-analog converters, amplifiers, and the like. Additionally, it may include a voice encoder/decoder, in which case it may communicate directly with the baseband processor 116. The microphone 136 will typically convert audio input, such as the user's voice, into an electrical signal, which is then digitized and passed directly or indirectly to the baseband processor 116. Audio information encoded in the received signal is recovered by the baseband processor 116, and converted by the interface circuitry 134 into an analog signal suitable for driving the speaker 138. The keypad 140 and display 142 enable the user to interact with the mobile terminal 106, input numbers to be dialed, address book information, or the like, as well as monitor call progress information. Alternate embodiments of the present invention may use the battery current limited buck switching power supply 38 or the battery current limited boost switching power supply 70 to provide power to the power amplifier circuitry 132.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. Switching power supply circuitry comprising:
    conversion circuitry comprising:
        a first buck transistor element configured to receive first battery current from a battery and provide a switching power supply current during a buck on phase of the conversion circuitry;
        a first boost transistor element configured to provide the switching power supply current during a boost on phase of the conversion circuitry, wherein the conversion circuitry is configured to provide a regulated output signal to a load based on the switching power supply current; and
        a first inductive element coupled between the first buck transistor element and the first boost transistor element; and
    control circuitry coupled to the conversion circuitry and configured to:
        generate a constant mirrored switching power supply current equal to the switching power supply current during the buck on phase;
        estimate an average battery current from the battery based on the switching power supply current and the constant mirrored switching power supply current to provide an estimated average battery current; and
        limit the regulated output signal based on the estimated average battery current to prevent the average battery current from exceeding an average battery current threshold.

2. The switching power supply circuitry of claim 1 wherein the conversion circuitry comprises a first buck transistor element coupled to the battery and adapted to provide the switching power supply current during the buck on phase, wherein during the buck on phase, the first buck transistor element is in an ON state.

3. The switching power supply circuitry of claim 2 wherein the first buck transistor element comprises a first P-type metal oxide semiconductor (PMOS) transistor element.

4. The switching power supply circuitry of claim 2 wherein the conversion circuitry further comprises a mirror buck transistor element adapted to provide the constant mirrored switching power supply current.

5. The switching power supply circuitry of claim 4 further comprising:
    current sensing circuitry adapted to provide a gated buck mirror signal based on the constant mirrored switching power supply current, wherein the gated buck mirror signal provides a time-accurate representation of the first battery current, and further wherein the estimated average battery current is further based on the gated buck mirror signal.

6. The switching power supply circuitry of claim 5 further comprising a lowpass filter adapted to receive and filter the gated buck mirror signal to provide a filtered gated buck mirror signal to the control circuitry, wherein the estimated average battery current is further based on the filtered gated buck mirror signal.

7. The switching power supply circuitry of claim 4, wherein generating the constant mirrored switching power supply current comprises:
    placing the battery current at a drain contact of the mirror buck transistor element;
    sampling a voltage at the source of the mirror buck transistor element during the buck on phase; and
    holding the sampled voltage at the source of the mirror buck transistor element.

8. The switching power supply circuitry of claim 2 wherein:
    the regulated output signal comprises an average output voltage and an average output current; and
    the control circuitry is further adapted to estimate the average output current based on the switching power supply current to provide an estimated average output current, wherein the estimated average battery current is further based on the estimated average output current.

9. The switching power supply circuitry of claim 8 wherein the control circuitry is further adapted to provide an estimated average output voltage, an estimated average battery voltage, and an estimated efficiency of the conversion circuitry, and the estimated average battery current is further based on the estimated average output voltage, the estimated average battery voltage, and the estimated efficiency of the conversion circuitry.

10. The switching power supply circuitry of claim 9 wherein the control circuitry is further adapted to:
    receive a control signal; and
    provide a buck switching signal to the conversion circuitry based on the control signal, wherein the regulated output signal is further based on the buck switching signal.

11. The switching power supply circuitry of claim 10 wherein the estimated efficiency is based on the control signal.

12. The switching power supply circuitry of claim 2 wherein the control circuitry is further adapted to estimate an instantaneous battery current from the battery based on the switching power supply current to provide an estimated instantaneous battery current, and the estimated average battery current is further based on the estimated instantaneous battery current.

13. The switching power supply circuitry of claim 12 wherein the control circuitry is further adapted to provide a buck switching signal to the conversion circuitry, wherein:
    the buck switching signal comprises:
        a buck switching period;
        a buck off phase; and
        the buck on phase;
    a duty-cycle of the switching power supply circuitry is about equal to a magnitude of the buck on phase divided by a magnitude of the buck switching period; and the estimated average battery current is about equal to a product of the estimated instantaneous battery current and the duty-cycle.

14. The switching power supply circuitry of claim 12 wherein the estimated instantaneous battery current is about equal to a magnitude of the switching power supply current.

15. The switching power supply circuitry of claim 1 wherein the conversion circuitry comprises a first boost transistor element and a first inductive element coupled between the first boost transistor element and the battery and adapted to provide the switching power supply current during a boost on phase, wherein during the boost on phase, the first boost transistor element is in an ON state.

16. The switching power supply circuitry of claim 15 wherein the first boost transistor element comprises a first N-type metal oxide semiconductor (NMOS) transistor element.

17. The switching power supply circuitry of claim 15 wherein:
the conversion circuitry further comprises a minor boost transistor element adapted to mirror the switching power supply current during the boost on phase to provide a mirrored switching power supply current; and
the estimated average battery current is further based on the mirrored switching power supply current.

18. The switching power supply circuitry of claim 15 wherein the estimated average battery current is about equal to a magnitude of the switching power supply current.

19. The switching power supply circuitry of claim 1 wherein the control circuitry is further adapted to:
receive a control signal; and
provide a buck switching signal to the conversion circuitry based on the control signal, wherein the regulated output signal is further based on the buck switching signal.

20. The switching power supply circuitry of claim 19 wherein the control circuitry is further adapted to provide a projection of the average battery current based on the control signal, and limiting the regulated output signal is further based on the projection.

21. The switching power supply circuitry of claim 19 wherein the control circuitry is further adapted to:
limit the regulated output signal based on an estimated average output current to prevent an average output current from exceeding an average output current threshold, which prevents the average battery current from exceeding the average battery current threshold; and
provide a projection of the average output current based on the control signal, and limiting the regulated output signal is further based on the projection.

22. The switching power supply circuitry of claim 1 wherein the control circuitry is further adapted to:
receive a control signal; and
provide a boost switching signal to the conversion circuitry based on the control signal, wherein the regulated output signal is further based on the boost switching signal.

23. The switching power supply circuitry of claim 22 wherein the control circuitry is further adapted to provide a projection of the average battery current based on the control signal, and limiting the regulated output signal is further based on the projection.

24. The switching power supply circuitry of claim 1 wherein the control circuitry is further adapted to:
estimate an instantaneous battery current from the battery based on the switching power supply current to provide an estimated instantaneous battery current; and
further limit the regulated output signal based on the estimated instantaneous battery current to prevent the instantaneous battery current from exceeding an instantaneous battery current threshold.

25. The switching power supply circuitry of claim 1 wherein the load comprises power amplifier circuitry.

26. The switching power supply circuitry of claim 1 wherein:
supplemental circuitry is adapted to receive a second battery current from the battery;
the supplemental circuitry is adapted to provide a supplemental current sense signal to the control circuitry based on the second battery current;
the control circuitry is further adapted to estimate the second battery current based on the supplemental current sense signal to provide an estimated second battery current; and
the estimated average battery current is further based on the estimated second battery current.

27. The switching power supply circuitry of claim 1 wherein the control circuitry is further adapted to limit the regulated output signal based on an estimated average output current to prevent an average output current from exceeding an average output current threshold, which prevents the average battery current from exceeding the average battery current threshold.

28. A method comprising:
receiving a battery current at a first buck transistor element;
generating a switching power supply current via the first buck transistor element during a buck on phase and via a first boost transistor element during a boost on phase, wherein a first inductive element is coupled between the first buck transistor and the first boost transistor based on the battery current;
providing a regulated output signal to a load based on the switching power supply current;
sensing the switching power supply current using current sensing circuitry comprising at least a transistor generate a constant mirrored switching power supply current equal to the switching power supply current during the buck on phase;
estimating an average battery current from the battery based on the switching power supply current and the constant mirrored switching power supply current to provide an estimated average battery current; and
limiting the regulated output signal based on the estimated average battery current to prevent the average battery current from exceeding an average battery current threshold.

* * * * *

UNITED STATES PATENT AND TRADEMARK OFFICE
CERTIFICATE OF CORRECTION

PATENT NO. : 9,178,364 B1
APPLICATION NO. : 12/209814
DATED : November 3, 2015
INVENTOR(S) : Nadim Khlat, Alexander Wayne Hietala and Chris Ngo It is certified that error appears in the above-identified patent and that said Letters Patent is hereby corrected as shown below:

In the Specification:

In column 12, line 67, Equation 2, replace the "–" with an -- = -- as follows:

"$V_{OUT}*I_{OUTAVEEST}-K*V_{BAT}*I_{BATAVEEST}$" with --$V_{OUT}*I_{OUTAVEEST}=K*V_{BAT}*I_{BATAVEEST}$--.

In the Claims:

In column 23, line 65, replace "minor buck" with --mirror buck--.

In column 24, lines 9 and 13, replace "minor signal" with --mirror signal--.

In column 25, line 21, replace "minor boost" with --mirror boost--.

Signed and Sealed this
Nineteenth Day of July, 2016

Michelle K. Lee
*Director of the United States Patent and Trademark Office*